(12) United States Patent
Lambert et al.

(10) Patent No.: US 8,511,111 B2
(45) Date of Patent: Aug. 20, 2013

(54) AUTOMOTIVE ADSORPTION HEAT PUMP

(76) Inventors: Michael A. Lambert, San Diego, CA (US); Benjamin J. Jones, Escondido, CA (US)

(*) Notice: Subject to any disclaimer, the term of this patent is extended or adjusted under 35 U.S.C. 154(b) by 630 days.

(21) Appl. No.: 11/917,132

(22) PCT Filed: Jun. 12, 2006

(86) PCT No.: PCT/US2006/022905
§ 371 (c)(1),
(2), (4) Date: Sep. 29, 2010

(87) PCT Pub. No.: WO2006/135871
PCT Pub. Date: Dec. 21, 2006

(65) Prior Publication Data
US 2011/0005267 A1    Jan. 13, 2011

Related U.S. Application Data

(60) Provisional application No. 60/689,664, filed on Jun. 10, 2005.

(51) Int. Cl.
*F25B 15/00* (2006.01)
(52) U.S. Cl.
USPC .......................................................... 62/476
(58) Field of Classification Search
USPC ............. 62/238.3, 238.7, 476, 480, 484, 485, 62/487, 494
See application file for complete search history.

(56) References Cited

U.S. PATENT DOCUMENTS

| | | | | | |
|---|---|---|---|---|---|
| 4,610,148 | A | * | 9/1986 | Shelton | 62/480 |
| 4,724,679 | A | * | 2/1988 | Radermacher | 62/101 |
| 5,005,371 | A | * | 4/1991 | Yonezawa et al. | 62/238.6 |
| 5,813,248 | A | * | 9/1998 | Zornes et al. | 62/480 |
| 6,630,012 | B2 | * | 10/2003 | Wegeng et al. | 95/106 |
| 2007/0089449 | A1 | * | 4/2007 | Gurin | 62/324.2 |

* cited by examiner

*Primary Examiner* — Melvin Jones
(74) *Attorney, Agent, or Firm* — The Law Office of Jane K. Babin, Professional Corporation; Jane K. Babin

(57) ABSTRACT

An adsorber unit has an outer shell, a plurality of internal tubes extending through the shell for carrying heat transfer fluid, each tube having outwardly projecting fins along its entire length, and a solid adsorbent material in the shell surrounding the tubes such that the fins project into the adsorbent material, the fins being of a material (e.g., metal) of higher thermal conductivity than the adsorbent material. Metal wool loosely packed inside the tubes, or internal radial fins swaged into the tubes, increase internal surface area thereby enhancing convective heat transfer. Metal wool loosely packed between the external fins, or fine wire metal coils lightly squeezed between the external fins, further increase external surface area of the heat exchanger in contact with the adsorbent thereby enhancing contact heat transfer. Performance is enhanced because the external fins and wool or wire coils transport heat more efficiently to all regions of the adsorbent, and permit less non-adsorbent heat exchanger material (e.g., metal) to be used for a given amount of adsorbent. Two or more such units are used in an adsorption heat pump. This design utilizes existing components (e.g., shell-&-tube heat exchanger, internally and externally finned tubing, and metal wool or wire coils) in a novel manner heretofore untried. In one exemplary embodiment, automobile air conditioning, exhaust heat is used to power such an air conditioner.

20 Claims, 28 Drawing Sheets

| Vehicle Type | Subcompact | Compact | Midsize |
|---|---|---|---|
| Engine Displacement, liter | 1.5, 4 cyl. | 2.0, 4 cyl. | 3.2, V-6 |
| Fuel | Gasoline | Gasoline | Gasoline |
| Heat of Combustion, kJ.liter$^{-1}$ = 0.75 kg.liter$^{-1}$ × 44,000 kJ.kg$^{-1}$ (LHV) | 33,000 | 33,000 | 33,000 |
| Air Conditioner Capacity, kW | 5.0 | 6.0 | 7.0 |
| Coefficient of Performance, $COP_C$, with $T_{cond}$=58°C, $T_{evap}$=3°C, $\eta_{Carnot}$=55% | 2.1 | 2.1 | 2.1 |
| Mechanical Power Consumed by Compressor at Full Capacity during initial 10 min. "surge cooling" interval (assume V-belt $\eta$ = 98%), kW | 2.4 | 2.9 | 3.4 |
| Mechanical Power Consumed by Compressor for 67% duty cycle (on 67% of time; off 33% of time) for typical 20 minute commute, kW | 1.6 | 2.0 | 2.3 |
| Highway Driving | | | |
| Average Speed, km.hr$^{-1}$ (miles.hr$^{-1}$) | 97 (60) | 97 (60) | 97 (60) |
| Fuel Mileage Without Air Conditioner, km.liter$^{-1}$ (miles.gal$^{-1}$) | 21.3 (50) | 15.3 (36) | 10.6 (25) |
| Fuel Consumption, liter.hr$^{-1}$ | 4.54 | 6.31 | 9.08 |
| Heat Liberated by Combustion of Fuel, kW | 41.6 | 57.8 | 83.3 |
| Thermal Efficiency, % | 30 | 30 | 30 |
| Mechanical Power Output, kW | 12.5 | 17.3 | 25.0 |
| % Additional Mechanical Power Consumed by Compressor at 67% duty | 13.2 | 11.2 | 9.3 |
| Heat Dissipated Via Exhaust, Radiator, & Surface of Engine Block, kW | 29.1 | 40.5 | 58.3 |
| Heat Dissipated Via Exhaust; 50% of total heat dissipated, kW | 14.6 | 20.3 | 29.2 |
| City Driving | | | |
| Average Driving Speed, km.hr$^{-1}$ (miles.hr$^{-1}$) | 56 (35) | 56 (35) | 56 (35) |
| Average Speed Including Stops, km.hr$^{-1}$ (miles.hr$^{-1}$) | 48 (30) | 48 (30) | 48 (30) |
| Fuel Mileage Without Air Conditioner, km.liter$^{-1}$ (miles.gal$^{-1}$) | 17.0 (40) | 12.8 (30) | 8.5 (20) |
| Fuel Consumption, liter.hr$^{-1}$ | 2.84 | 3.79 | 5.68 |
| Heat Liberated by Combustion of Fuel, kW | 26.0 | 34.7 | 52.0 |
| Thermal Efficiency, % | 30 | 30 | 30 |
| Mechanical Power Output, kW | 7.8 | 10.4 | 15.6 |
| % Additional Mechanical Power Consumed by Compressor at 67% duty | 21.0 | 18.6 | 14.8 |
| Heat Dissipated Via Exhaust, Radiator, & Surface of Engine Block, kW | 18.2 | 24.3 | 36.4 |
| Heat Dissipated Via Exhaust; 50% of total heat dissipated, kW | 9.1 | 12.2 | 18.2 |
| Idling or Traffic Jam | | | |
| Average Speed Including Stops, km.hr$^{-1}$ | 0 | 0 | 0 |
| Fuel Mileage Without Air Conditioner, km.liter$^{-1}$ | 0 | 0 | 0 |
| Fuel Consumption (assuming 0.38 liter.hr$^{-1}$ per liter displacement), liter.hr$^{-1}$ | 0.57 | 0.76 | 1.21 |
| Heat Liberated by Combustion of Fuel, kW | 5.2 | 6.9 | 11.1 |
| Net Thermal Efficiency, % | 0 | 0 | 0 |
| Mechanical Power required to overcome internal friction and operate alternator, water pump, & power steering pump, kW | 2.4 | 3.3 | 5.2 |
| % Additional Mechanical Power Consumed by Compressor at 67% duty | 65 | 61 | 44 |
| Heat Dissipated Via Exhaust, Radiator, & Surface of Engine Block, kW | 1.7 | 2.3 | 3.7 |
| Heat Dissipated Via Exhaust; 67% of total heat dissipated, kW | 3.5 | 4.6 | 7.4 |

| Investigation | Type of Results | Configuration of Adsorber | Adsorbent / Refrigerant | $COP_c$ | SCP W/kg ads. | Regeneration (%) | $k_{ads}$ W/m-K | $h_{fluac}$ W/m²-K | $V_{ads}/A_{cont} \approx d_{max}$ mm | FOM $=NTU \times \frac{C_{ads}}{C_{inert}}$ | $COP_c$/FOM |
|---|---|---|---|---|---|---|---|---|---|---|---|
| Miles et al. [17] | Experimental | Helical coiled HEX tubing in bed of adsorbent pellets | Carbon / $NH_3$ | 0.80 | 220 | | | | ~10 | | |
| Tchernev et al. [7, 8] | Experimental | Serpentine flat pipe HEX b/w adsorbent bricks | zeolite NaX / $H_2O$ | 1.2 | 21.5 W/kg adsorbent; 4.5 W/kg adsorber (i.e., with metal) | 75 | 0.25 | ≈1000 | 5 | 5.52 = 5.54 × 1.014 | 0.217 |
| Cacciola & Restuccia [27, 28] | predicted | Shell-&-tube with thin adsorbent layer deposited on tubes | zeolite 4A / $H_2O$ zeolite 13X / $H_2O$ carbon AC35 / $CH_3OH$ | 0.75-0.85 | | | | | 12 | | |
| Ben Amar et al. [20] | predicted | Concentric tubes: HTF inner; adsorbent outer | zeolite NaX / $H_2O$ carbon AX21 / $NH_3$ | 1.07 0.99 | 142 140 | 70 75 | | | 4-7 4-7 | | |
| Guilleminot et al. [22, 23] | Experimental | Concentric tubes: HTF inner, adsorbent outer | compressed zeolite & graphite with binder (silica gel) / $H_2O$ | 0.41-0.68 | 115-135 | | | | 13-24 | | |
| Pons et al. [19] | Experimental | Concentric tubes: adsorbent inner, HTF outer | zeolite 13X + graphite / $H_2O$ | 0.89 | 35 | 45-70 | 5-15 | 200-3000 | 25-50 | 6.8 | 0.21 |
| Meunier & Douss [18] | Experimental | Concentric tubes: adsorbent inner, HTF outer; Cascade cycle | zeolite / $H_2O$ for lower temp. cycle graphite / $CH_3OH$ for higher temp cycle | 1.06 | 37 | 45-70 | 0.5 for zeolite, 15 for graphite | 200-3000 | 25-50 | 6.8 | 0.25 |
| Present | predicted | *Shell-&-tube, *Multi-channel HTF tubes, *Helical, annular fins on HTF tubes, *Metal wool b/w annular fins | activated carbon coated with $CaCl_2$ / $NH_3$ | 0.46-0.83; with avg. = 0.69 | 264 W/kg adsorbent; 89 W/kg adsorber (i.e., with metal) | 79.6 | ≥1 conservative min. | ≥ 200 conservative min. | 0.35 | 1.13 = 1.77 × 0.641 | 0.440 |

| Adsorbent | Zeolites | | | | | | Mordenite (mineral) | Activated Graphite & Carbon Fiber | Silica Gel | Activated Alumina |
|---|---|---|---|---|---|---|---|---|---|---|
| | 3A (K) | 4A (Na) | 5A (Ca) | 13X (Na) | X (Ca) | Y (Ca) | | | | |
| Refrigerant | (wt%) | (wt%) | (wt%) | (wt%) | (wt%) | (wt%) | (wt%) | (wt%) | (wt%) | (wt%) |
| Water | 26 | 27 | 26 | 30 | 36 | 34 | 15 | | 33 | 15 |
| Ammonia | 15 | 15 | 16 | 16 | 22 | 21 | | 62 | 13 | |
| Methanol | 0 | 19 | 18.5 | 23 | | | | 55 | ~50 | |
| Sulfur Dioxide | 29 | 29 | 29 | 44 | | | 24 | | | |
| Carbon Dioxide | 18 | 18 | 18 | 39 | 29 | 15 | 12.6 | | | |
| Carbon Monoxide | | | | 16.5 | 7 | 0 | 12.5 | | | |
| Hydrogen Sulfide | 17 | 24 | 17 | 34 | | | | | | |
| Methane | 0 | 5.8 | | 8 | 2.9 | | 0 | 51 | | |
| Ethane | 0 | 6 | 6.5 | 9 | | | 0 | 10 | 1.5 | |
| Propane | 0 | 0.5 | 10 | 14 | | | 0 | 21 | 6 | |
| n-butane | | | | 18 | | | | | | |
| iso-butane | | 0 | | 12.5 | | | 4.9 | | | |
| n-Heptane | 0 | 0 | 14 | 21 | 20 | | 6 | 39 | 26 | |
| Benzene | 0 | 0 | 0 | 18 | | 25 | | 44 | 35 | |
| Acetone | | | | yes | | | | 61 | | |

FIGURE 20

| Refrigerant | Chemical Formula | Melting Point | Boiling Point | Heat of Vapori zation | Heat of Fusion | Density of Liquid | Volumetric Heat of Vaporization of Liquid | Thermal Conductivity of Gas | Specific Heat of Gas | Thermal Diffusivity of Gas | Thermal Diffusivity of Liquid |
|---|---|---|---|---|---|---|---|---|---|---|---|
| | | °C | °C | kJ.kg$^{-1}$ | kJ.kg$^{-1}$ | kg.m$^{-3}$ | MJ.m$^{-3}$ | W.m$^{-1}$.K$^{-1}$ | J.kg$^{-1}$.K$^{-1}$ | m$^2$.s$^{-1}$×10$^{-5}$ | M$^2$.s$^{-1}$×10$^{-5}$ |
| Water | H$_2$O | 0 | 100 | 2257 | 333.7 | 997 | 2251 | *0.0181 | *2041 | *35.1 | 0.0130 |
| Ammonia | NH$_3$ | -77.7 | -30 | 1368 | 322.4 | 682 | 932 | 0.0246 | 2200 | 1.550 | 0.0178 |
| Methanol | CH$_3$OH | -97.7 | 65 | 1100 | 99.2 | 787 | 872 | 0.02 | 1550 | 1.056 | |
| Ethanol | C$_2$H$_5$OH | -114.2 | 79 | 838 | 109 | 783 | 665 | 0.0147 | 1830 | 0.069 | 0.00889 |
| Methyl Amine | CH$_3$NH$_2$ | | -6 | 836 | | 703 | 588 | | | | |
| Formaldehyde | HCHO | | -19 | 768 | | 815 | 626 | | | | |
| Sulfur Dioxide | SO$_2$ | -76 | -10 | 368 | | 883 | 534 | | | | 0.0104 |
| Carbon Dioxide | CO$_2$ | -79 | -56 | 230.5 | 18.4 | 298 | 171 | 0.0166 | 852 | 1.090 | 0.004 |
| Methane | CH$_4$ | -182.2 | -161 | 512 | 58 | 446 | 248 | 0.0121 | 2070 | 0.327 | |
| Ethane | C$_2$H$_6$ | | -88 | 488 | 45 | | | 0.0218 | | | |
| Propane | C$_3$H$_8$ | -188 | -42 | 426 | 80 | 581 | 248 | 0.0183 | | | |
| n-butane | C$_4$H$_{10}$ | -138.5 | 0 | 385 | 80 | 601 | 231 | 0.016 | | | |
| iso-butane | C$_4$H$_{10}$ | -160 | -12 | 376 | 106 | 594 | 218 | 0.0163 | | | |
| Halocarbon R-134a | CF$_3$CH$_2$F | -96.6 | -26 | 217 | 27 | 1374 | 298 | 0.00952 | 784 | 0.231 | 2.95 |

FIGURE 21

| Material | Alloy | Melting Temperature (or range) (°C) | Density (kg.m$^{-3}$) | Yield Strength (MPa) | Coefficient of Thermal Expansion (K$^{-1}$x10$^{-6}$) | Thermal Conductivity (W.m$^{-1}$.K$^{-1}$) | Specific Heat (J.kg$^{-1}$.K$^{-1}$) |
|---|---|---|---|---|---|---|---|
| Aluminum | pure (>99.5%) | 646-657 | 2710 | 17 | 23.6 | 231 | 903 |
| Aluminum | Alloy 2014 | 507-638 | 2800 | 97 | 22.5 | 192 | ~900 |
| Aluminum | Alloy 2024-T3 | 502-638 | 2780 | 345 | 23.2 | 121 | 875 |
| Steel (low-C) | AISI 1020 | 1495-1520 | 7860 | 295 | 11.7 | 55 | 434 |
| Steel (med-C) | AISI 1040 | 1495-1505 | 7850 | 350 | 11.3 | 52 | 434 |
| Steel (high-C) | AISI 1080 | 1385-1475 | 7840 | 380 | 11.0 | 48 | 434 |
| Low Alloy Steel | AISI 1022 | 1495 | 7860 | 360 | 14.0 | 50 | 472 |
| Low Alloy Steel | AISI 4130 | 1537 | 7850 | 435 | 11.9 | 43 | 477 |
| Low Alloy Steel | AISI 4340 | ~1537 | 7850 | 470 | 12.6 | 45 | 475 |
| Stainless Steel | 446 (Ferritic) | 1425-1510 | 7800 | 345 | 10.4 | 21 | 460 |
| Stainless Steel | 316 (Austenitic) | 1370-1400 | 8000 | 207 | 16.0 | 16 | 468 |
| Stainless Steel | 410 (Martensitic) | 1480-1530 | 7800 | 275 | 9.9 | 25 | 460 |
| Copper | pure (>99.95%) | 1085 | 8940 | 69 | 16.5 | 398 | 385 |
| Brass | (70%Cu, 30%Zn) | 915-955 | 8530 | 75 | 20.0 | 120 | 380 |
| Bronze | (92%Cu, 8%Sn) | 880-1020 | 8800 | 152 | 18.2 | 62 | 420 |

FIGURE 22

| Activated Carbon | | Annular Helical Fins (Annealed 1010) | |
|---|---|---|---|
| $\rho$ (kg.m$^{-3}$) | 2210 | Outside diameter | 22.2 |
| $c_p$ (J.kg$^{-1}$.K$^{-1}$) | 1033 | Inside diameter (mm) | 12.7 |
| Porosity (%) | 50.6 | Thickness (mm) | 0.25 |
| Adsorbent Mass (kg) | 2.18 | Pitch (mm) | 2.54 |
| Adsorbent Thermal | 2247 | Spacing b/w fins (mm) | 2.29 |
| | | Surface area (m$^2$) | 1.227 |
| | | Fin metal volume | 0.1508 |
| | | Fin metal mass (kg) | 1.181 |
| Shell (Stainless Steel 304L) | | Fin metal thermal | 583 |
| Outside diameter (mm) | 114.3 | | |
| Inside diameter (mm) | 111.25 | Wool between Fins (Annealed 1010 | |
| Wall thickness (mm) | 1.52 | Volume packing | 6 |
| Internal length (mm) | 304.8 | Fiber diameter (μm) | 100 |
| Thickness of end plates | 6.35 | Total length (m) | 12,100 |
| Internal volume for | 1.997 | Surface area (m$^2$) | 3.80 |
| Shell metal volume | 0.2647 | Effective fin length | 5 |
| Shell metal mass (kg) | 2.091 | Wool metal volume | 0.0950 |
| Shell metal thermal | 1085 | Wool metal mass (kg) | 0.744 |
| | | Wool metal thermal | 368 |
| HTF Tubes (Stainless Steel 304L) | | | |
| # of internally threaded | 19 | Wool inside HTF Tubes (Copper) | |
| Outside diameter (mm) | 12.7 | Volume packing | 10 |
| Inside diameter (mm) | 9.5 | Fiber diameter (μm) | 40 |
| Length (mm) | 304.8 | Wool metal volume | 0.0410 |
| Internal surface area | 0.346 | Wool metal mass (kg) | 0.367 |
| Exposed external | 0.208 | Wool metal thermal | 146 |
| Tube metal volume | 0.3231 | | |
| Tube metal mass (kg) | 2.553 | Total surface area of | 5.235 |
| Tube metal thermal | 1325 | tubes, fins, | |
| | | | |
| $\rho$ SAE 1010 mild steel | 7832 | $c_p$ SAE 1010 mild | 494 |
| $\rho$ stainless steel 304 | 7900 | $c_p$ stainless steel 304 | 519 |
| $\rho$ Copper (kg.m$^{-3}$) | 8933 | $c_p$ Copper (J.kg$^{-1}$.K$^{-1}$) | 399 |
| Total metal mass (kg) | 6.936 | Total metal thermal | 3507 |

FIGURE 24

|  | Idle | City | Highway |
|---|---|---|---|
| Engine speed, RPM | 700 | 2000 | 3500 |
| $V_{intake}$ (m³.s⁻¹) | 0.00776 | 0.0250 | 0.0438 |
| $T_{intake}$ (K) | 298 | 298 | 298 |
| $\rho_{air}$ (kg.m⁻³) at 298 K | 1.1614 | 1.1614 | 1.1614 |
| Intake manifold pressure (kPa) | 88.2 | 71.9 | 57.5 |
| Intake manifold pressure (% of | 87.0 | 70.9 | 56.8 |
| $\dot{m}_{exh}$ (kg.s⁻¹) | 0.00902 | 0.0206 | 0.0294 |
| $T_{exh,in}$ (°C) | 400 | 450 | 500 |
| $T_{exh,out}$ (°C) | 100 | 100 | 100 |
| $\bar{T}_{exh}$ (°C) | 250 | 275 | 300 |
| $T_{dead}$ (°C) | 25 | 25 | 25 |
| $c_{p,exh}$ (J.kg⁻¹.K⁻¹), assumed same | 1,035 | 1,040 | 1,045 |
| $\dot{Q}_{exh}$ (kW) when cooled to $T_{dead}$ | 3.50 | 9.10 | 14.6 |
| $\dot{Q}_{exh}$ (kW) from Fig. 1 | 3.50 | 9.10 | 14.6 |
| $\dot{Q}_{exh,avail}$ (kW) when cooled to | 2.80 | 7.50 | 12.3 |
| $\dot{Q}_{exh,avail} \div \dot{Q}_{exh}$ | 0.80 | 0.82 | 0.84 |

FIGURE 25

|  | Idling | City Cruise | Highway Cruise | Post-Commute (Engine Off) | Cumulative or Average |
|---|---|---|---|---|---|
| $Q'_{cool}$ (kW) | 2.00 | 3.33 | 4.00 | 2.00 | |
| $Q'_{cooling}$ (kW) of one adsorber | 4.74 | 7.90 | 9.48 | 4.74 | |
| $\Delta T_{ITT\,ads,cooling}$ (K) | 37.6 | 62.7 | 75.2 | 37.6 | |
| $T_{ITT,ads}$ (°C) | 237.6 | 262.7 | 275.2 | 237.6 | |
| $Q'_{cooling}$ (kW) of two adsorbers | 2.37 | 3.95 | 4.74 | 2.37 | |
| $\Delta T_{ITT\,ads,cooling}$ (K) | 18.8 | 31.4 | 37.6 | 18.8 | |
| $T_{ITT,ads}$ (°C) | 76.2 | 63.6 | 67.7 | 76.2 | |
| Interval in mode during 20 minute commute (min.) | 7 | 8 | 5 | 0 | 20 |
| Interval for heat pump operation, $t_{mode}$ (min.) | 5 | 5 | 5 | 10 | 25 |
| $x_{avg}$ | 0.690 | 0.527 | 0.428 | 0.690 | Avg. = 0.605 |
| $Q'_{cooling}$ (kW) needed | 2.41 | 6.70 | 9.65 | 2.41 | Σ = 120 kW·min |
| $Q'_{exh,cool}$ (kW) available | 2.80 | 7.50 | 12.30 | 0 | Σ = 141 kW·min |
| $Q'_{ITT,heater}$ (kW) recovered | 2.73 | 7.09 | 11.50 | 0 | Σ = 133 kW·min |
| $Q'_{cooling} / Q'_{ITT,heater}$ | 0.88 | 0.94 | 0.84 | 0.88 | Avg. = 0.884 |
| $COP_C$ | 0.83 | 0.50 | 0.46 | 0.83 | Avg. = 0.69 |
| $SCP$ (kW·kg$^{-1}$ adsorbent) | 0.306 | 0.509 | 0.612 | 0.306 | Avg. = 0.408 |
| $Q_{cool} = Q'_{cool} \times t_{mode}$ (kW·min) | 10.0 | 16.7 | 20.0 | 20.0 | Σ = 66.7 kW·min |

FIGURE 27

| HTF Tubes | | Exhaust Channels b/w Corrugated Fins | |
|---|---|---|---|
| # of serpentine tube passes | 8 | # of rows of corrugated fins | 9 |
| # of tubes per pass | 16 | # of exhaust channels per row | 60 |
| Total # of tubes | 128 | Total # of exhaust channels | 540 |
| Tube length, $L_{tube}$ (mm) | 457 | Channel length, $L_{ch}$ (mm) | 406 |
| Tube wall thickness (mm) | 0.8 | Fin pitch (mm) | 6.9 |
| Height of lumen in oval tube (mm) | 1.9 | Fin height (mm) | 6.0 |
| Width of lumen in oval tuve (mm) | 11.4 | Fin thickness (mm) | 0.18 |
| Lumen aspect ratio: width to height | 6 | $D_{h,exh}$ of channel (mm) | 6.2 |
| $D_{h,HTF}$ (mm) | 2.8 | Surface area, fins & tubes, $A_s$ (m$^2$) | 5.50 |
| Tube internal surface area, $A_{s,HTF}$ (m$^2$) | 1.45 | Frontal area, $A_{frontal}$ (m$^2$) | 0.0334 |
| | | Free flow area, $A_{free-flow}$ (m$^2$) | 0.0172 |
| | | Diameter of in/out exhaust pipe (mm) | 50.8 |

FIGURE 29

|  | Idle | City Cruise | Highway Cruise |
|---|---|---|---|
| Engine Speed, RPM | 700 | 2,000 | 3,500 |
| HTF Inside Oval Tubes | | | |
| $\dot{m}_{HTF}$ (kg.s$^{-1}$) | 0.0181 | 0.0362 | 0.0543 |
| $T_{HTF,in}$ (°C) | 60 | 60 | 60 |
| $T_{HTF,out}$ (°C) | 260 | 260 | 260 |
| $\bar{T}_{HTF}$ (°C) | 160 | 160 | 160 |
| $D_h$ (m) of oval lumen HTF tubes | 0.0028 | 0.0028 | 0.0028 |
| $Re_D$ of HTF | 992 | 1914 | 2976 |
| $\overline{Nu}_D$ of HTF | 8.08 | 10.2 | 11.7 |
| $h_{HTF}$ (W.m$^{-2}$.K$^{-1}$) | 336 | 423 | 486 |
| $A_{tube}$ (m$^2$) | 1.45 | 1.45 | 1.45 |
| $R_{HTF}$ (K.W$^{-1}$) | 0.00205 | 0.00165 | 0.00142 |
| Exhaust Through Finned Channels | | | |
| $\dot{m}_{exh}$ (kg.s$^{-1}$) | 0.00902 | 0.0206 | 0.0294 |
| $A_{flow}$ (m$^2$) | 0.0173 | 0.0172 | 0.0172 |
| $\dot{V}_{exh}$ (m$^3$.s$^{-1}$) | 0.0136 | 0.0318 | 0.0485 |
| $V_{exh}$ (m.s$^{-1}$) | 0.79 | 1.85 | 2.82 |
| $D_h$ (m) of channels b/w corrugated fins | 0.0062 | 0.0062 | 0.0062 |
| $Re_D$ of exhaust | 116 | 256 | 357 |
| $\overline{Nu}_D$ of exhaust | 3.90 | 5.25 | 5.68 |
| $h_{exh}$ (W.m$^{-2}$.K$^{-1}$) | 26.6 | 39.4 | 41.6 |
| $A_{fin}$ (m$^2$) | 5.50 | 5.50 | 5.50 |
| $R_{fin}$ (K.W$^{-1}$) | 0.00683 | 0.00463 | 0.00437 |
| NTU & Effectiveness, $\varepsilon_{HEX}$ | | | |
| $R_{total}$ (K.W$^{-1}$) | 0.00888 | 0.00684 | 0.00579 |
| $NTU = (R_{total} \times \dot{m}_{exh} \times c_{p,exh})^{-1}$ | 12.1 | 7.05 | 5.62 |
| $C_{ratio} = C^*_{min} \div C^*_{max} = C^*_{exh} \div C^*_{HTF}$ | 0.262 | 0.301 | 0.288 |
| $\varepsilon_{HEX} = 1 - \exp\{-C_{ratio}^{-1}[1-\exp(-C_{ratio}(NTU))]\}$ | 0.974 | 0.946 | 0.938 |
| Heat Rate & Temperature Difference | | | |
| $\dot{Q}'_{HTFheater} = \varepsilon_{HEX} \times \dot{Q}'_{exh,avail}$ (W) | 2,730 | 7,090 | 11,500 |
| $\Delta T_{exh-HTF} = \dot{Q}'_{HTFheater} \times R_{total}$ (K) | 24 | 48 | 67 |
| $\dot{Q}'_{node-cp}$ (W) | 2,410 | 6,700 | 9,650 |
| $\dot{Q}'_{node-cp} \div \dot{Q}'_{HTFheater}$ | 0.88 | 0.94 | 0.84 |
| Exhaust Pressure Drop | | | |
| $\Delta P_{exh}$ (Pa) | -50 | -200 | -400 |

FIGURE 30

| Vehicle Type | Sub-Compact (Hybrid) | Compact | Midsize |
|---|---|---|---|
| Vehicle Mass, curb mass plus single occupant, i.e., commuter (kg) | 1100 | 1325 | 1550 |
| Cooling Capacity (kW) | 5.0 | 6.0 | 7.0 |
| Mechanical Compression Air Conditioner | | | |
| Coefficient of Performance, $COP_C$, at Carnot efficiency = 55% | 2.1 | 2.1 | 2.1 |
| Mechanical Power Consumed by Compressor: (kW) [assume 67% duty cycle for typical commute and 2% loss in V-belt] | 1.6 | 2.0 | 2.3 |
| Mass of Mechanical Compressor and Mounting Hardware (kg) | 7 | 8 | 10 |
| Mass of Accumulator (kg) | 1.5 | 2 | 2 |
| Mass of Refrigerant R-134a and Compressor Lubricant (kg) | 1 | 1.2 | 1.5 |
| Total Mass[a] of Compressor, Accumulator, & Refrigerant (kg) | 9.5 | 11.2 | 13.5 |
| Adsorption Air Conditioner | | | |
| Mass[b] of Refrigerant Stored in Reservoir (kg) | 2.2 | 2.6 | 3.0 |
| Mass of Reservoir Canister and Inter-loop Heat Exchanger (kg) | 3 | 3.5 | 4 |
| Mass[c] of Adsorbent Required (kg) | 6.5 | 7.8 | 9.2 |
| Mass[d] of HTF heater core [stainless steel] & HTF cooler [aluminum] (kg) | 9.6 | 11.5 | 13.4 |
| Mass of HTF (kg) | 4.5 | 5.4 | 6.3 |
| Mass of phase change material [PCM] for storing exhaust heat [for lithium; zinc would require 3 times more mass] (kg) | 2.5 | 3 | 3.5 |
| Mass of metallic components of 3 adsorbers [stainless steel 304L shells & tubes; low carbon steel fins & wool] (kg) | 21 | 24 | 27 |
| Total Mass[a] of Adsorbers, Reservoir, Refrigerant, HTF Heater, HTF cooler, Inter-loop HEX, and PCM (kg) | 49 | 58 | 66 |

(a) The masses of the condenser and evaporator have been omitted, since these are approximately equal for both mechanical compression and adsorption air conditioners.

(b) All the refrigerant is stored in the reservoir, because all adsorbers are dried out after the engine is turned off by pumping hot HTF through the saturated adsorbers.

(c) The quantities of adsorbent and refrigerant listed for each type of automobile are sufficient to replenish the refrigerant reservoir over a 20 minute drive after start-up of a cold engine.

(d) Exhaust expands within the HTF heater, allowing the muffler to be omitted. The shell of the HTF heater and the bypass exhaust pipe are offset by the muffler shell and its internal pipes and baffles.

FIGURE 31

AUTOMOTIVE ADSORPTION HEAT PUMP

CROSS REFERENCE TO RELATED APPLICATION

This application claims the benefit of U.S. Provisional Application No. 60/689,664, filed Jun. 10, 2005.

BACKGROUND OF THE INVENTION

1. Automotive Cooling Technology Options
1.1 Typical Driving Scenario

In order to estimate the fuel savings afforded by an adsorption air conditioner, it is necessary to define the basis of the estimation, which will be the typical commute to and from work. In the USA, driving mileage is distributed 38% commuting, 35% for running family businesses, and 27% for social, recreational, and religious activities. The average yearly mileage has increased from 16,539 km in 1990 to 18,870 km in 1999 [1], so a round estimate of 19,312 km.yr$^{-1}$ (12,000 miles.yr$^{-1}$) is assumed for 2006. Therefore, the average round trip commute is 30.6 km=(19,312 km.yr$^{-1}$×38% commuting÷240 work days).

Assuming the typical commute is 50% city driving and 50% highway driving, and that the average city street speed is 56 km.hr$^{-1}$ (35 miles.hr$^{-1}$) and the average highway speed is 97 km.hr$^{-1}$ (60 miles.hr$^{-1}$), the typical commuter spends 16 minutes on city streets and 10 minutes on freeways each day. Also, the typical commuter spends 62 hours per year idling (at stop signs, traffic signals, freeway on ramps, and in traffic jams) in rush hour traffic [2]. This equates to another 15 minutes per day. Thus the total daily commute time is 16+10+15=41 minutes, ≈20 minutes to work and ≈20 minutes returning home.

1.2. Automotive Cooling Requirements and Current Mechanical Compression Technology The cabin of a car parked in the open for a couple of hours on a sunny and warm, not necessarily hot, day will get very hot because the large area windows admit sunlight but trap infrared radiation emanating from the interior (i.e., the greenhouse effect). This is called "hot soaking." Interior temperature can easily reach 60° C. on a warm (25° C.) day, and exceed 70° C. on a truly hot (35° C.) day [3].

FIG. 1 shows the effect of operating the air conditioner on fuel mileage for three classes of automobiles (subcompact, compact, and midsize) during highway cruising, city driving, and idling, and includes the amount of waste heat generated during each scenario. For example, the air conditioner of a midsize car must have about 7 kW capacity to cool the "hot soaked" cabin to a comfortable temperature within 10 minutes after start-up [3, 4]. During the initial 10 minute "surge cooling" interval, the air conditioner runs continuously (i.e., 100% duty cycle), after which it runs intermittently to maintain a comfortable cabin, remaining on about ⅓ of the time (33% duty cycle), providing an average of 2.3 kW cooling. Thus, for the typical 20 minute commute, the average cooling load is 4.7 kW [=(7 kW×10 min.+2.3 kW×10 min.)÷20 min.].

The Coefficient of Performance for Cooling [$COP_C$, a measure of efficiency equal to cooling (kW) divided by work input (kW)] of automotive air conditioners is quite low. Heat pumps commonly exhibit $COP_C$=3.8 or greater for state-of-the-art stationary (e.g., residential) applications with a modest temperature "lift" ($T_{lift}=T_{cond}-T_{evap}$) of 45° C.−5° C.=40° C. However, $COP_C$ drops to about 2.1 for vehicles, because $T_{lift}$ is increased to about 58° C.−3° C.=55° C. to permit smaller condensers and evaporators, and each ° C. increase in $T_{lift}$ results in a 2% to 4% decrease in $COP_C$ [3.8(1-3% avg.× $\Delta T_{lift}$)=3.8(1−0.03×15° C.)=2.1]. Mechanical compressors are compact and light with Specific Cooling Power, SCP≈1000 W.kg$^{-1}$ [5].

1.3 Potential Fuel Savings

The fuel savings to be realized from an exhaust powered air conditioner is that due to eliminating the parasitic power consumption of the mechanical compressor. The overwhelming majority (>97%) of light duty vehicles (cars, vans, pickups, SUVs) employ spark ignition (Otto cycle), gasoline burning engines, with state-of-the-art thermal efficiency of 30%. The remaining 70% of the heat of combustion is dissipated as heat, about 35% via the radiator and 35% in the exhaust at city and highway speeds where ram air induction effectively cools the radiator [1]. At idle, a larger portion of waste heat (≈⅔=67%) is discarded via the exhaust. Even the minimal 3.5 kW of exhaust heat from an idling subcompact (see FIG. 1) should be enough to power a regenerative (heat recycling) adsorption heat pump providing 1.7 kW cooling (at 33% duty cycle) needed to maintain cabin comfort after initial surge cooling.

The average parasitic power drain by the compressor of a midsize car during the typical commute is 2.3 kW, and is obtained by dividing the average 4.7 kW cooling load by $COP_C$=2.1, then adding a conservative 2% for belt friction. This average of 2.3 kW is 9.3% of the 25.0 kW needed to propel a midsize car in highway cruising and 14.8% of the 15.6 kW required for city driving (FIG. 1). The idling engine of a midsize car requires about 3 kW to overcome internal friction. Add another 0.7 kW for back EMF from the alternator (at 40 A×14V÷80% efficiency) with A/C off and 1.5 kW for resistance from the torque converter for a total of 5.2 kW. Thus, the compressor comprises an extra 44% load (=2.3 kW÷5.2 kW) on an idling engine.

Therefore, the average midsize car with a mechanical compressor consumes 16% more fuel when the air conditioner is used during commuting.

$$\frac{16 \min \times (15.6 + 2.3) \text{ kW} + 10 \min \times (25.0 + 2.3) \text{ kW} + 14 \min \times (5.2 + 2.3) \text{ kW}}{(16 \min \times 15.6 \text{ kW}) + (10 \min \times 25.0 \text{ kW}) + (14 \min \times 5.2 \text{ kW})} = 1.16 = 16\% \quad (1)$$

A heat pump powered by presently wasted exhaust would eliminate the 16% additional power needed to operate the mechanical compressor during the typical commute. Viewed differently, an exhaust powered heat pump will reduce fuel consumption an average of [(116%−100%)÷116%]≈14% during air conditioner operation. Substituting values for compact and subcompact cars from FIG. 1 into the above equation yields fuel savings of 17% and 18%, respectively.

Assuming the cooling season averages four months for the USA, the annual fuel savings is ~5% for small to midsize vehicles. Europe as a whole is the second largest automobile market, after the USA, but has significantly lesser need for automotive cooling, although the percentage of new vehicles equipped with air conditioning is rapidly increasing nonetheless. For sunnier Southern European locations bordering on the Mediterranean (Iberia, southern France, Italy, Greece, and the Balkans), savings similar those for the Southern USA "Sunbelt" would be expected, significantly greater than the nationwide average of ~5%. Greater than 5% savings would be expected in the large market (rivaling Europe) comprised of equatorial South America (principally Brazil, followed by Northern Argentina then Venezuela and Columbia), Australia, South Africa, Saharan Africa (principally Egypt), the Near East, Middle East, and Southeast Asia (principally Singapore, Taiwan, and South Korea). But fuel economy may not matter much in the Middle East. Although China and India have the #1 and #2 populations (⅓ of the world's) and are rapidly developing, consuming ever greater amounts of oil, reliable inexpensive transportation is still the order of the day, so air conditioning automobiles is not yet a significant consideration. Central Africa has a huge population and large cooling requirement, but it is a small automobile market with basic transportation as the goal. Japan, although a major automobile market (fourth), has minimal need for automotive cooling.

1.3 Utilizing Waste Heat

There are three potential uses for waste heat in a vehicle: (a) cabin heating, (b) cabin cooling, and (c) electricity generation, the latter of which could be used for heating and cooling. Heating is already performed efficiently, compactly, and economically by routing engine coolant through a small finned tube heat exchanger (HEX) in the cabin air duct. The only drawback is the long delay (5+ min.) during frigid weather between engine start-up and effective cabin heating and defrosting.

Alternators are typically rated at 105 A×14 V=1.5 kW, which equates to a mechanical load on the engine of about 2.0 kW, assuming η=75%. Average alternator load is about half rated output, since most driving is done in daylight with the lights off, the cabin fan is usually on low or medium instead of high, and the wipers are seldom used. The fuel pump runs constantly, but the thermostatically controlled radiator fan often shuts off at city cruise speed. So the power drain by an alternator at 50% (50 A) of rated output is about 2.0 kW×50%=1.0 kW.

A thermoelectric generator directly powered by exhaust heat could conceivably replace the alternator, and power motors connected to the water pump, power steering pump, and compressor. The average power drawn by the compressor during a typical 20 minute commute is 1.6 to 2.3 kW (FIG. 1), equal or greater than for all other ancillary equipment combined ($\approx$1.0 kW by the alternator plus $\approx$0.7 kW by the water and power steering pumps). So, eliminating the compressor provides the greatest boost to efficiency.

Using a thermoelectric generator to power a motor driving a compressor is only one method of eliminating its parasitic power drain. There are a number of thermal effect devices which can convert wasted exhaust heat directly into cabin cooling without having to go through the intermediate step of producing electricity with the attendant losses in efficiency. Alternative cooling technologies are reviewed next to determine the best option.

1.5 Alternative Cooling Technologies 1.5.1 Stirling Cycle Cooling

Recent improvements in efficiency of reversed Stirling cycle systems (achieving $COP_C$=3.0) still do not approach the efficiency of the best reversed Rankine cycle designs ($COP_C \geqq 5$). Also, a reversed Stirling cycle heat pump requires work input. But it cannot be belt driven by the engine if the goal is to eliminate the parasitic power loss associated with cabin cooling. So the heat pump must be driven by a motor that is powered by a thermoelectric generator. This combination of three components would add considerable mass. Each energy transformation from heat to electricity to mechanical work to heat (cooling) would incur loss in efficiency.

A state-of-the-art design [6] is reported to have SCP=12 W.kg$^{-1}$, with $COP_C$=3.0, and $T_{lift}$=20° C., about one-third of the required $T_{lift} \approx$55° C. Increasing $T_{lift}$ to the required range will markedly reduce $COP_C$ and SCP. But, even ignoring this degradation of performance, a reversed Stirling cycle heat pump capable of delivering 7 kW of cooling would have a mass of 580 kg [=7000 W÷12 W.kg$^{-1}$], not accounting for the considerable mass of the thermo-electric generator.

1.5.2 Absorption (Liquid-Vapor) Cooling

The major difference between the liquid-vapor absorption chiller and the mechanical-vapor-compression heat pump is the primary form of energy used to power the cycle. The vapor compressor is replaced by a liquid pump, which requires a fraction of the power ($\approx$4%) to pump the much denser liquid solution of refrigerant and absorbent to high pressure. A burner or solar collector or low quality heat from a power plant or industrial process heats the "generator" causing refrigerant to desorb from the absorbent. The most common refrigerant-absorbent pairs are ammonia-water ($NH_3$—$H_2O$) and water-lithium bromide ($H_2O$—LiBr). Absorption systems attain $COP_C \leqq$0.65 to 0.70 for "single effect" heating cycles which do not recover and reuse heat after it passes through the system. "Double effect" heating or "heat recovery" (i.e., recycling of heat) yields up to $COP_C$=1.2, but such devices are bulkier, more complex, and costlier.

Boatto et al. [4] constructed an automotive absorption system. They had difficulties in designing major components to meet geometrical and functional specifications for integration in a car. High system mass was also a problem. Separation of the refrigerant from the absorbent in the "generator" was strongly affected by acceleration and vibration. They suggested that the best refrigerant-absorbent pair was $H_2O$—LiBr, but cautioned that corrosion by the hot brine was a challenging problem. Boatto et al. [4] concluded that preheating the brine with engine coolant entailed too many complications, and so chose to remain with a system employing single effect heating that used only exhaust heat and yielded $COP_C \approx$0.5.

1.5.3 Absorption (Solid-Vapor) Cooling

Solid-vapor adsorption is similar to liquid-vapor absorption, except that the refrigerant is adsorbed onto a solid desiccant (freeze dried) rather than absorbed into a liquid (dissolved). The adsorption cycle is illustrated in FIG. 2 and proceeds as follows:

a. At state 1, a cool canister, or adsorber, contains adsorbent saturated with a large fraction of refrigerant at slightly below $P_{evap}$. The cool adsorber is heated and desorbs refrigerant vapor isosterically (i.e., at constant total mass in the adsorber), thereby pressurizing it to state 2, slightly above $P_{cond}$. At this point vapor starts being forced out the hot adsorber, through a one-way "check" valve to the condenser.

b. Isobaric heating desorbs more refrigerant, forcing it out the adsorber and into the condenser until state 3 is attained, whereat the adsorber is nearly devoid of refrigerant.

c. The hot adsorber is then cooled isosterically (at constant total mass) causing adsorption and depressurization, until the pressure drops below $P_{evap}$ (state 4) opening another check valve to allow vapor to enter the adsorber from the evaporator.

d. Isobaric cooling to state 1 saturates the adsorbent, completing the cycle.

Thus, the mechanical compressor can be replaced with one or more adsorbers. Cyclically and asynchronously heating and cooling two or more adsorbers results in continuous cooling. Solid-vapor heat pumps require a low quality heat source at typically 150 to 250° C. Catalyzed automobile exhaust is usually at least 400° C., even at idle.

Prototype adsorption (solid-vapor) systems with innovations for recycling heat (up to 75% to date) have achieved $COP_C$=1.2 [7, 8]. Also, adsorption systems can be designed to be unaffected by acceleration and vibration, do not use highly corrosive brine, and can be smaller for a given capacity than absorption systems. An SCP of 220 W.kg$^{-1}$ of adsorbent has been demonstrated [9] and SCP=590 W.kg$^{-1}$ adsorbent has been predicted [10].

Three adsorbent-refrigerant pairs have received the most attention to date: zeolite (a class of highly nano-scopically porous, alkali-alumino-silicate minerals with cage-like crystalline lattices)-water, activated carbon-ammonia, and silica gel ($SiO_2$)-methanol ($CH_3OH$).

1.5.4 Thermoelectric Cooling (Peltier Devices)

Although Peltier coolers can exhibit up to η=45% [11], they tend to have very low SCP of 10-25 W.kg$^{-1}$ [12], as compared with SCP=1000 W.kg$^{-1}$ for a mechanical compressor [5]. Also, an automotive Peltier device would need an exhaust powered, thermoelectric generator with efficiency η≦5% [13] and extremely low SCP=0.25 W.kg$^{-1}$ [14]. The cost is $4 to $5 per watt [11].

Thus, although simple in concept, a thermoelectric cooling system would exhibit a mere η=45%×5%=2.2%, far too low to be powered by engine exhaust. It would provide no more than 0.44 kW cooling for a compact car, as compared with 6 kW needed for surge cooling (FIG. 1). The Peltier device would have a mass of 240 kg (=6 kW÷25 W.kg$^{-1}$), and the thermoelectric generator, assuming a very optimistic SCP=10 W.kg$^{-1}$, would have a mass of 1300 kg [=6 kW÷10 W.kg$^{-1}$) ÷45%].

1.5.5 Selection of the Most Promising Alternative Cooling Technology

Of the four alternative technologies reviewed above, adsorption (solid-vapor) cooling is the most promising. The other three alternate cooling technologies are either unfeasible or not as promising as solid-vapor adsorption cooling for reasons described above.

2. Literature Review: State of the Art in Adsorption Heat Pumps

2.1 Simple Cycle Adsorption Heat Pumps Not Utilizing Heat Recycling

Solid-vapor adsorption heat pumps were used in domestic refrigerators and railroad cars in the 1920's and 1930's [15]. The $COP_C$ for built and tested simple cycle (i.e., "single effect" heating with no recycling of heat) adsorption heat pumps is 0.3 to 0.4 [9]. This is primarily due to the fact that heat rejected from the adsorbent during the cooling phase was simply discarded. A second reason for low $COP_C$ and SCP is that much of the mass (the pressure vessel and its internal heat exchanger) is non-adsorbing, or so-called "dead," mass that is unavoidably heated and cooled with the adsorbent but contributes nothing to the compression effect.

2.2 Recycling Heat to Increase $COP_C$ $COP_C$ can be increased by recycling heat that is necessarily rejected from the adsorbent bed being cooled by transferring it to the adsorbent bed being heated, thereby reducing the required external heat input ("make up" heat). A heat transfer fluid (HTF: oil or glycol-water solution) is used to exchange heat between beds. The effectiveness of heat recycling depends upon how the heat is transferred from the bed being cooled to the bed being heated, which is bounded by two extremes: (a) uniform temperature heat recovery or "double effect" heating, and (b) "thermal wave" regeneration described below.

2.2.1 Uniform Temperature Heat Recovery or "Double Effect" Heating

Uniform temperature heat recovery or double effect heating (FIG. 3) can reduce required "make-up" heat by about 40% in a two-bed device, boosting $COP_C$ from 0.3 to 0.4 for single effect (no recycling of heat) adsorption devices to 0.5 to 0.65 [0.3÷(1−0.4)=0.5; and 0.4÷(1−0.4)≈0.65]. Once the beds reach equal temperature, double effect heating is no longer possible (FIG. 3). Thus, the theoretical limit of heat recovery for a two-bed device is 50%, but the aforementioned 40% is the practical limit [9].

2.2.2 "Thermal Wave" Regeneration

"Thermal wave" regeneration results from employing moving temperature gradients or "thermal waves" that traverse the adsorbent beds to heat and cool them (FIG. 4) and was first suggested by Tchernev and Emerson [7]. Thermal wave regeneration is more efficient than uniform temperature heat recovery for a given number of beds, since heat is transferred across a smaller temperature difference, creating less entropy. Tchernev et al. [7, 8] demonstrated 75% thermal wave regeneration, elevating $COP_C$ to about 1.2 [0.3÷(1−0.75)=1.2]. The theoretical maximum efficiency for thermal wave regeneration is 100% for an infinitesimal ΔT between HTF and adsorbent; however, the practical limit has been estimated at 85% [8].

2.3 Synopsis of State-of-the-Art in Adsorption Heat Pumps

The current state-of-the-art in adsorption heat pumps has been reviewed. Research groups in the United States, Italy, France, China, and Japan have concentrated their efforts [17-29] on devising improvements to the all-critical adsorbers, with the primary goal of improving efficiency ($COP_C$), which requires increasing the percentage of recycled heat. Several investigations, e.g., [17, 19-24, 26, 28], agree in identifying the two most important parameters that must be maximized in order to increase $COP_C$: (1) the ratio of adsorbent ("live") mass to non-adsorbent (inert or "dead") thermal mass $C_{ads}/C_{inert}$, and (2) the NTU of the heat exchanger. Since they have been working to maximize $COP_C$ for stationary applications, little effort has been directed toward increasing SCP, which is at least as important as $COP_C$ for transportation applications.

According to Lambert and Jones [16], some designs suffer from low thermal mass ratio $C_{ads}/C_{inert}$, the first of the two critical governing parameters identified above. And most also suffer from low NTU, the second critical governing parameter, because they do not distribute heat effectively due to small contact area $A_{contact}$ between the HEX and a given volume of adsorbent ¥$_{ads}$, such as the concentric tube configurations in FIGS. 5 and 6. Thermal resistance due to small $A_{contact}$ is exacerbated by the typically poor junction conductance $k_{junc}$ between the metallic HEX and the nonmetallic adsorbent. FIGS. 7 and 8 show two configurations with substantially greater $A_{contact}$, a shell-&-tube type (FIG. 7) and a spiral tape type (FIG. 8) devised by Wang et al. [25]. But these latter two types provide much greater $A_{contact}$ at the expense of markedly lower $C_{ads}/C_{inert}$. The one exception is the flat pipe serpentine HEX winding between consolidated adsorbent tiles designed by Tchernev et al. [7, 8], as shown in FIG. 9. However, this design posed insurmountable problems in manufacturability, reliability, and expense, owing to its delicate configuration and sub-atmospheric pressure that allowed for air leaks into the system.

Another limitation of previous designs is that none embody a satisfactory method for increasing the poor thermal conductivity of adsorbents $k_{ads}$ while retaining sufficient permeability to refrigerant vapor. Consolidating adsorbents into bricks increased $k_{ads}$ and marginally increased junction conductance $h_{junc}$ but decreased vapor permeability by 3 to 4 orders of magnitude [7, 8, 18-20, 22, 23]. Binders used in consolidation occlude pores. Some designs use a coiled tubing HEX inside beds of packed spheres [17], resulting in a very low effective $k_{ads}$. None of the studies consider settling of the adsorbent particles, which may cause adsorbent to lose contact with the heat exchanger. Performance parameters for several investigations are compiled in FIG. 10.

SUMMARY OF THE INVENTION

It is an object of the present invention to provide a new and enhanced adsorption heat pump which is more efficient and reliable, as well as less expensive.

It is a further object of the present invention to provide a new and enhanced adsorber unit for use in an adsorption heat pump or air conditioning system.

In one aspect of the present invention, an adsorber unit for an adsorption heat pump is provided, which comprises:
- a thermally insulated outer shell with a first end and a second end;
- a first, and second thermally insulated plenum having the first plenum attached to the first end of the outer shell and the second plenum attached to the second end of the outer shell, wherein each plenum has at least one opening;
- a plurality of thermally conductive tubes aligned longitudinally inside the shell, wherein each tube comprises a plurality of projections extending from the outside of the tube and projecting outwardly therefrom, wherein each tube has a first and second ends; and wherein: the first end of each tube is attached to the first plenum, and the second end of the tube is attached to the second plenum;
- at least one solid absorbent inside the shell surrounding the tubes; and
- at least one refrigerant capable of being adsorbed and desorbed by the adsorbent, inside the outer shell;

wherein the outer shell, the first and second plenums, and the outside surfaces of the tubes form a closed system for containment of the absorbent and the refrigerant.

In another aspect, at least one of the thermally conductive tubes of the adsorber unit further comprises first thermally conductive material filled between the projections for further increasing the heat transfer surface area. Suitable thermally conductive materials include, but are not limited to, metal wool, metal wires, carbon fibers, or mixtures thereof. The first thermally conductive material may have a total surface area at least as large as the total outside surface area of the tubes. The first thermally conductive material may also have a total surface area about at least twice, at least about three-times, at least about 5-times, or at least about 10 times as large as the outside surface area of the tubes.

In some embodiments, the solid adsorbent in the adsorber unit may be one or more selected from the group consisting of zeolites, silicas, aluminas, active carbons, and graphites. Various types zeolites, silicas, aluminas, active carbons, and graphites may be used in the present invention. The adsorbent may be powders, particulates or granules.

In certain embodiments, the refrigerant may be one or more selected from the group consisting of water, ammonium, and low-boiling point alcohols, and halogenated refrigerants.

In certain embodiments, the projections have higher thermal conductivity than the adsorbent. In particular, the thermal conductivity of the projections is at least about twice, at least three-times, at least about five-times, at least about 10-times, at least about 20-times, or at least 100-times greater than that of the adsorbent. The projections may have various geometries, such as annular, triangular, rectangular, square, etc. The projections may also be constructed from various thermal conductive materials, for examples, but not limited to, aluminum, copper, gold, silver, iron, or alloys. The projections may be thin metal strips. The projections may also be fins. The projections may have a total surface area at least as large as the total outside surface area of the tubes. The projections may also have a total surface area about at least twice, at least about three-times, at least about 5-times, or at least about 10 times as large as the outside surface area of the tubes.

In some embodiments, the tubes may have a greater transverse thermal conductance than their longitudinal thermal conductance. In particular, the transverse thermal conductance is at least about 1.2-times, at least about 1.5-times, at least about twice, at least about 5-times, at least about 10-times greater than the longitudinal thermal conductance.

In still another aspect, each tube of the absorber unit further comprises a second thermally conductive material inside of the tube and contacting with the inside surface of the tube with minimum blocking the flow of a heat transfer medium passing through the tube. Suitable thermally conductive materials include, but are not limited to, metal wool, metal wires, carbon fibers, or mixtures thereof.

In an exemplary embodiment, an adsorber unit for a heat pump comprises a cylindrical outer shell containing a plurality of tubes passing longitudinally through the shell. Both ends of the tubes are connected to plenums (or manifolds), one external and fixed to one end of the shell, the other internal and free to telescope within the shell due to thermal expansion of the tubes relative to the shell. The tubes carry heat transfer fluid (HTF) for cyclically heating and cooling the adsorber unit. Each tube has numerous outwardly projecting fins extending along its length which project into solid adsorbent material surrounding the tubes and filling the shell. The fins are of a material with higher thermal conductivity than the adsorbent material.

In another exemplary embodiment of the invention, the fins comprise thin, helically wound, annular strips of metallic material such as carbon steel which are brazed to the outer surface of the heat transfer fluid (HTF) tubes, and the adsorbent material may be powdered or particulate graphite or carbon. However, alternative metallic (e.g., stainless steel, aluminum, or copper) fins may be used in other embodiments and any suitable solid adsorbent material (e.g., zeolite or silica gel) may also be used. The fins in the exemplary embodiment have two orders of magnitude greater thermal conductivity than the adsorbent material, which is typically in particulate or powder form.

In this invention, the fins will effectively conduct heat to all regions of the adsorbent, increasing the heat transfer rate and allowing for a relatively wide spacing between the tubes inside the adsorber shell, reducing the non-adsorbent, or "dead," mass. The fins have an order of magnitude greater surface area than the HTF tubes, which counters the low conductance through the microscopic contacts and vapor filled gaps between the fins and the particulate or powdered adsorbent.

The fins may be aligned perpendicular to the longitudinal axis of the HTF tubes (i.e., transversely). In the exemplary embodiment, the fins are a continuous annular helix, with adjacent annuli closely spaced, approximately two to three millimeters apart, along the entire length of the adsorber. This results in a high ratio of transverse to longitudinal conductance, which promotes "thermal wave" regeneration of heat, resulting in a higher Coefficient of Performance for Cooling ($COP_C$) than afforded by uniform temperature heat recovery. To further increase the surface area of the heat exchanger, metal wool may be loosely packed between the fins, or small (e.g., 3 mm) diameter coils of fine wire may be lightly squeezed between the fins. The metal wool or fine wire metal coils may be of copper, aluminum, or steel. They are fused to the fins by diffusion bonding (slow welding over time at elevated temperature near the melting point) or plating (e.g., electro- or electro-less nickel plating).

In an exemplary embodiment of the invention, metal wool material, for example 10% by volume copper wool, may be inserted into the HTF tubes running through the adsorber shells. The heat transfer fluid (HTF) may be oil or glycol/water mixture. Copper has at least 1000 times the thermal conductivity of oil or water/glycol (400 W.m.K$^{-1}$ for copper versus 0.1 W.m.K$^{-1}$ for oil and 0.4 W.m.K$^{-1}$ for a 50/50 water/glycol mixture). Thus, the copper transports heat from the core regions of the HTF near the center of the tubes to the inside surfaces of the tubes, increasing convective heat transfer. The HTF flow rate is very low, so the increase in pressure drop incurred by the copper wool inserts is minimal, thereby negligibly affecting the pumping power required to circulate the HTF around the circuit. Alternatively, an extruded, asterisk shaped, metallic insert may be swaged into the HTF tubes, with each spoke of the asterisk forming an internal radial fin. These radial fins increase internal surface area, thereby increasing convective heat transfer.

According to still another aspect of the present invention, an adsorption heat pump is provided, which consists of at least two adsorbers, each comprised of an outer shell, at least one tube for carrying HTF extending through each shell, each tube having outwardly projecting fins extending along its length, and a solid adsorbent material in the shell surrounding the tube such that the fins project into the adsorbent material, the fins being of a material of higher thermal conductivity than the adsorbent material, an HTF heater having an inlet end connected to the HTF tube in a first adsorber and an outlet end connected the HTF tube in the second adsorber, an HTF cooler having an inlet end connected to the HTF tube in the second adsorber and an outlet end connected to the HTF tube in the first adsorber, and a refrigerant loop having an evaporator and a condenser connected between the adsorber shells such that refrigerant fluid flows through the adsorbent material in the shells.

Such a heat pump may be used for any cooling or heating application, such as residential, commercial, industrial, agricultural heat pumps or chillers, refrigerated trucks or trailers, buses, trains, and ships, and vehicle air conditioning systems. A vehicle air conditioning system using the heat pump and enhanced adsorbers of this invention could be powered by exhaust heat.

In an exemplary embodiment of a vehicle adsorption air conditioning system powered by exhaust heat, one or more thermal reservoirs for storing exhaust heat may be secured to the HTF manifolds of the HTF heater. The thermal reservoirs contain a phase change material (PCM) such as wax, molten zinc, or molten lithium to store exhaust heat when the engine is running above idle. This stored heat will be used after the engine is shut off to desorb practically all refrigerant from the adsorbers for storage in the refrigerant reservoir. Refrigerant from the reservoir is then used to provide cooling immediately after start up of a cold engine.

There are additional advantages in an exhaust powered automotive or other vehicle air conditioning system incorporating the adsorption heat pump of this invention. An automotive or vehicle adsorber is subject to shocks and vibrations which will eventually pulverize rather fragile consolidated adsorbent bricks into powder, which will tend to settle. The fins on the HTF tubes in each adsorber shell will retain adsorbent powder, and even if some settling occurs over time, the fins will effectively distribute heat to the adsorbent.

BRIEF DESCRIPTION OF THE DRAWINGS

FIG. 1: Effect of operating the air conditioner on performance of three classes of vehicles.

FIG. 10: Performance of regenerative adsorption heat pumps.

FIG. 20: Adsorptivity (kg per kg=wt %) of selected substances in various adsorbents at 1 atm and 25° C. [31-33].

FIG. 21: Thermo-physical properties of selected refrigerants at 300 K and 1 atm.

FIG. 22: Some common metals and alloys for adsorber construction.

FIG. 24: Adsorber geometry, mass, and thermal capacitance (or "mass") at $T_{ads}$=147° C.

FIG. 25: Exhaust parameters for subcompact car with 1.5-liter engine.

FIG. 27: Performance of adsorption heat pump in subcompact car with 1.5 Liter engine.

FIG. 29: Geometry of HTF heater.

FIG. 30: Thermal & fluidic performance of HTF heater for subcompact car.

FIG. 31. Comparison of adsorption heat pump to mechanical compression air conditioner.

DETAILED DESCRIPTION OF THE INVENTION

Figure 2:
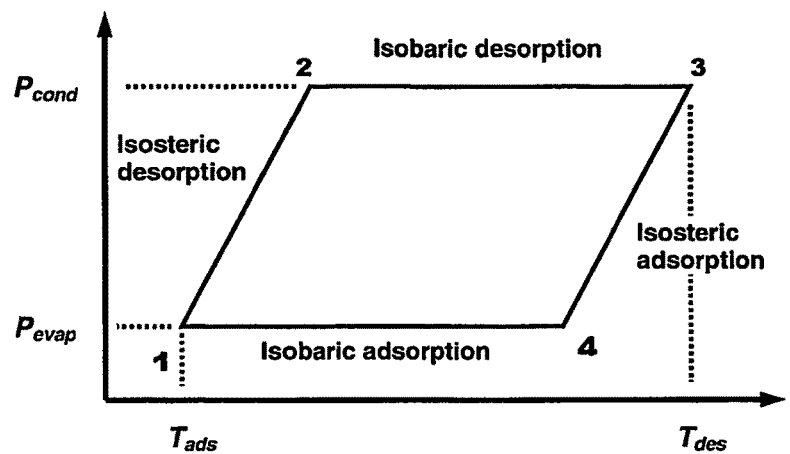
FIG. 2: Thermodynamic cycle for adsorption.
Figure 3:
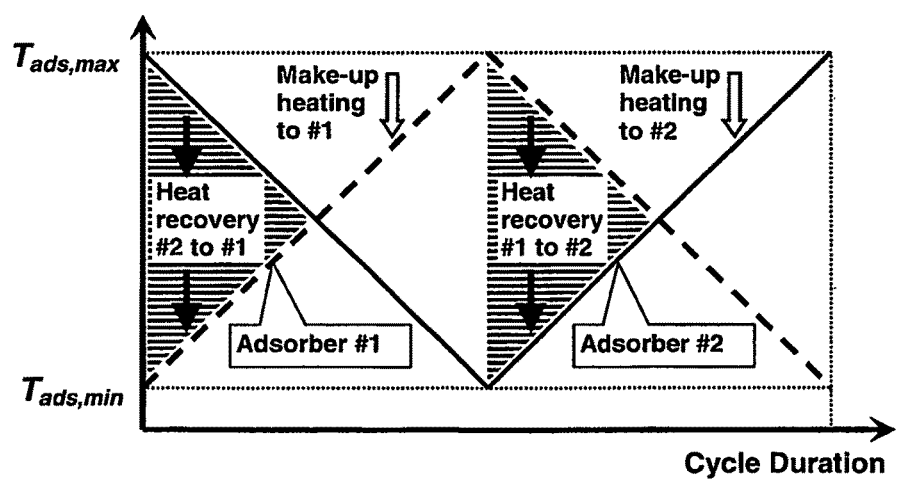
FIG. 3: Uniform temperature heat recovery or "double effect" heating.
Figure 4:
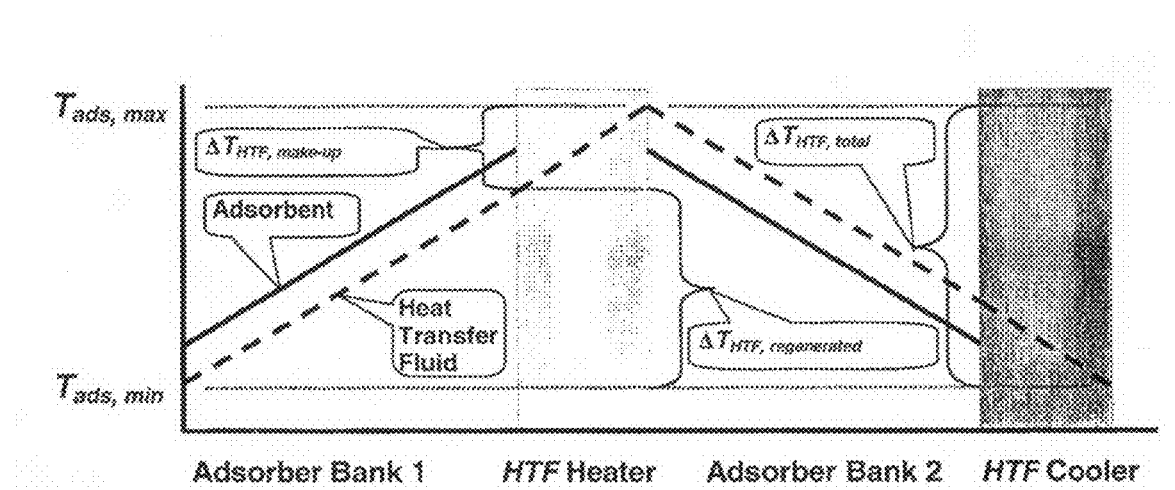
FIG. 4: Temperature variation through adsorbers, HTF heater, and HTF cooler for "thermal wave" regeneration.
Figure 5:
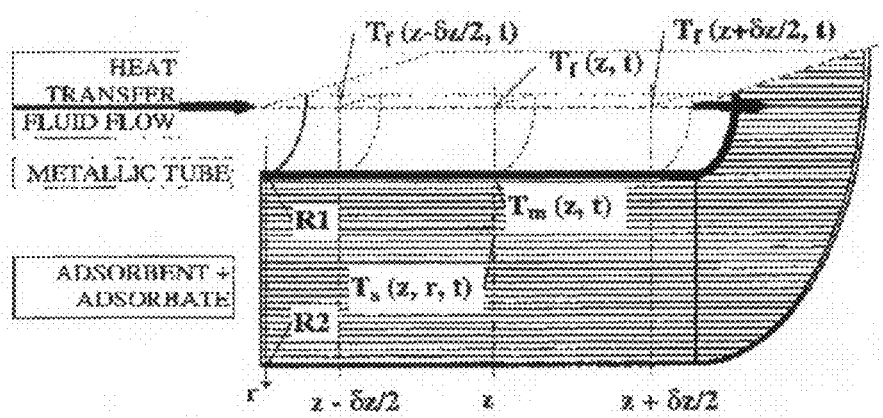
FIG. 5: Isometric cutaway of a segment of concentric tube adsorber of Guillerminot et al. [20, 22, and 23]. Heat transfer fluid (HTF) flows through the inner tube, and the annulus are filled with consolidated adsorbent.
Figure 6:
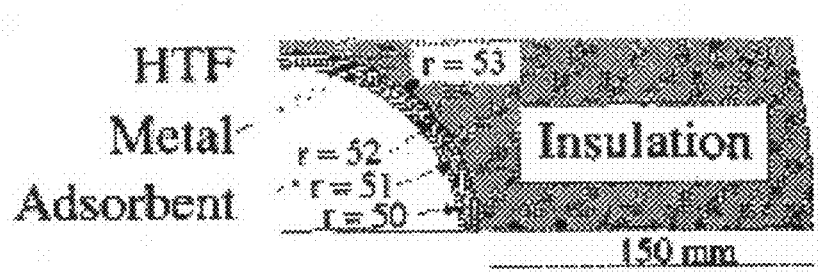
FIG. 6: Longitudinal cross-section of concentric tube adsorber used by Pons et al. [18, 19]. The inner tube is filled with consolidated adsorbent, and HTF flows through the narrow annulus.
Figure 7:
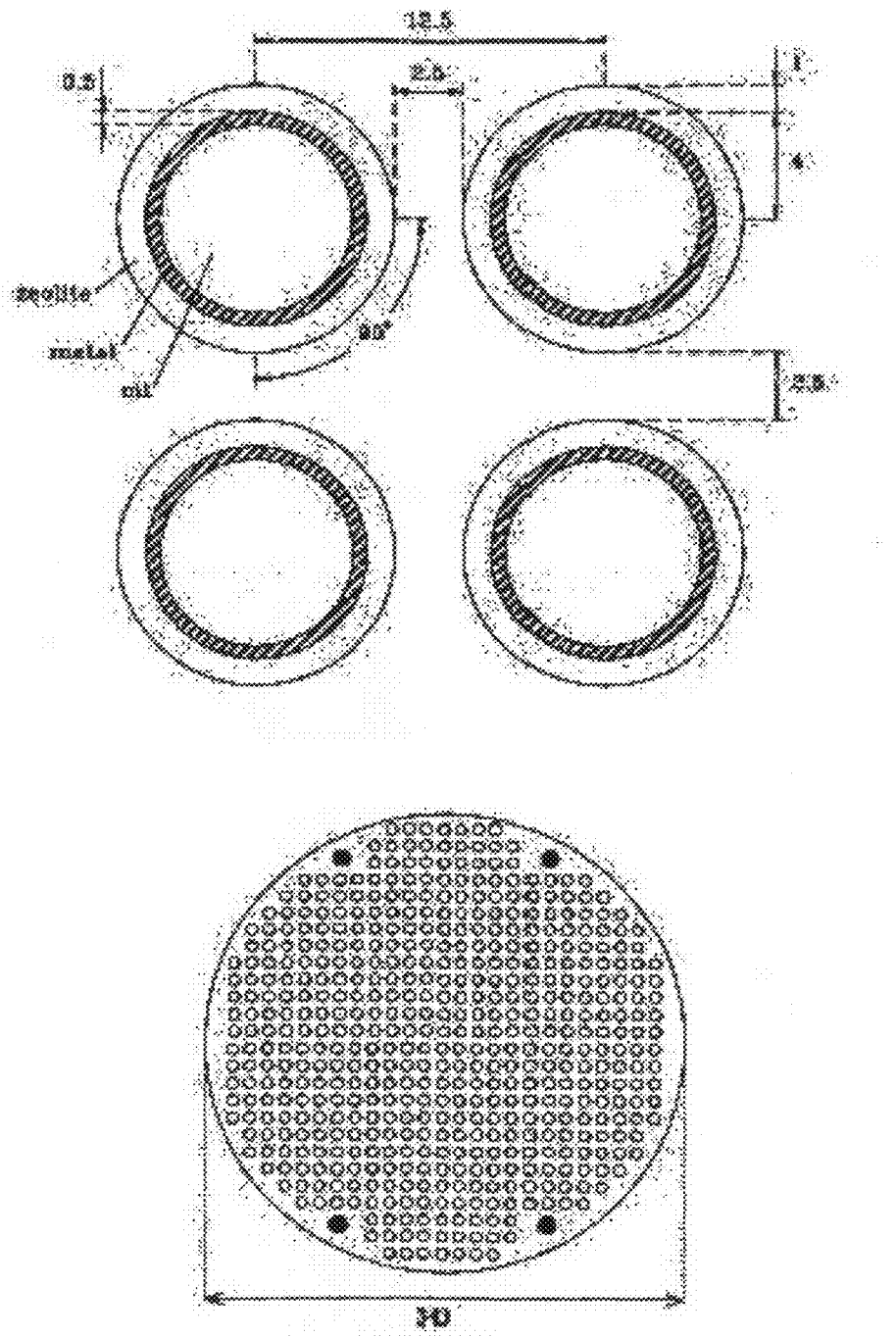
FIG. 7: Longitudinal cross-section of the shell-&-tube adsorber used by Cacciola et al. [28]. Thin layers of zeolite mineral adsorbent (white) are synthesized on the metal tubes (dark crosshatching), and HTF flows through the tubes, while refrigerant vapor occupies the spaces in the shell.
Figure 8:
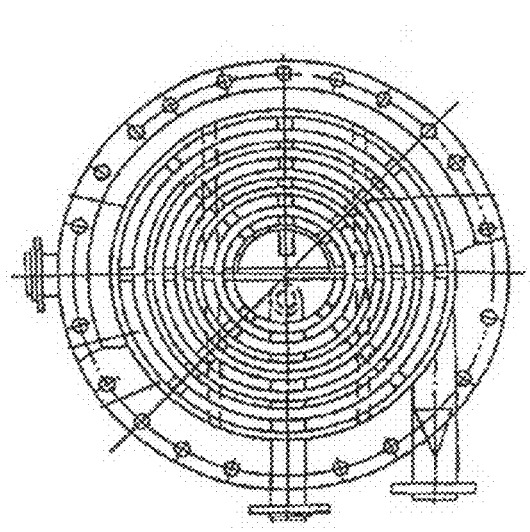
FIG. 8: Adsorber with internal spiral tape HEX proposed by Wang et al. [25].

As used in this disclosure, the singular forms "a", "an", and "the" may refer to plural articles unless specifically stated otherwise. Furthermore, the use of grammatical equivalents of articles is not meant to imply differences among these terms unless specifically indicated in the context. Unless defined otherwise, all technical and scientific terms used herein generally have the same meaning as commonly understood by one of ordinary skill in the art to which this invention belongs.

To facilitate understanding of the invention set forth in the disclosure that follows, a number of terms are defined below.

| Nomenclature | |
|---|---|
| A | surface, contact, or cross-sectional area (m$^2$) |
| $c_p$ | specific heat (J · kg$^{-1}$ · K$^{-1}$) |
| C | thermal capacitance, or thermal "mass," C = m × cp (J · K$^{-1}$) |
| C$^\bullet$ | dynamic thermal capacitance, C$^\bullet$ = m$^\bullet$ × $c_p$ (W · K$^{-1}$) |
| COP$_C$ | coefficient of performance for cooling, a dimensionless measure of efficiency |
| D$_h$ | hydraulic diameter (m) |
| h$_{ads}$ | heat of adsorption (kJ · kg$^{-1}$) |
| Δh$_{evap}$ | latent heat gain in evaporator (kJ · kg$^{-1}$) |
| h$_{fg}$ | heat of vaporization (kJ · kg$^{-1}$) |
| h$_{HTF}$ | convection heat transfer coefficient of heat transfer fluid (W · m$^{-2}$ · K$^{-1}$) |
| h$_{junc}$ | junction thermal conductance of metal to vapor filled adsorbent (W · m$^{-2}$ · K$^{-1}$) |
| HEX | heat exchanger |
| HTF | heat transfer fluid |
| k | thermal conductivity (W · m$^{-1}$ · K$^{-1}$) |
| L | length of tube or fin (m) |
| m$^\bullet$ | mass flow rate (kg · s$^{-1}$) |
| mf | mass fraction of refrigerant in adsorbent |
| N$_{tube}$ | number of HTF tubes in the adsorber |
| Nu$_D$ | Nusselt Number |
| NTU | Number of Transfer Units for a heat exchanger, dimensionless, NTU = U × A ÷ C$^\bullet$ |
| P$_{cond}$ | condenser pressure (kPa or MPa) |
| P$_{evap}$ | evaporator pressure (kPa or MPa) |
| PCM | phase change material for storing exhaust heat (e.g., wax, zinc, or lithium) |
| Pr | Prandtl number |
| Q$^\bullet$ | heat rate (W) |
| R | thermal resistance, R = 1 ÷ (U × A)(K · W$^{-1}$) |
| Re$_D$ | Reynolds number based on tube or channel hydraulic diameter |
| SCP | specific cooling power (W · kg$^{-1}$) |
| S$_y$ | yield strength (MPa) |
| S$_{ys}$ | shear yield strength (MPa) |
| ΔT | temperature difference (K) |
| T$_{ads,max}$ | maximum adsorbent temperature (° C) |
| T$_{ads,min}$ | minimum adsorbent temperature (° C) |
| T$_{cond}$ | condenser temperature (° C) |
| t$_{evap}$ | evaporator temperature (° C) |
| T$_{lift}$ | temperature difference between evaporator and condenser, T$_{lift}$ ≡ T$_{cond}$ − T$_{evap}$ (K) |
| U | overall heat transfer coefficient per unit area (W · m$^{-2}$ · K$^{-1}$) |
| U × A | overall heat transfer coefficient for given area (W · K$^{-1}$) |
| V | velocity (m · s$^{-1}$) |
| $\mathcal{V}$ | volumetric flow rate (m$^3$ · s$^{-1}$) |
| δ$_{ads}$ | average adsorbent thickness (m) |
| ε$_{HEX}$ | effectiveness of heat exchanger |
| η | conversion efficiency (e.g., thermoelectric, Peltier, or electro-mechanical) |
| η$_{Carnot}$ | Carnot thermodynamic efficiency |
| η$_{fin}$ | efficiency of annular helical fins on HTF tubes |
| η$_{pin}$ | efficiency of metal wool fiber "pin" fins between annular helical fins |
| η$_o$ | overall surface efficiency of HTF tubes, annular helical fins, and metal wool |
| μ | dynamic viscosity (N · s · m$^{-2}$) |
| ν | kinematic viscosity (m$^2$ · s$^{-1}$) |
| ρ | density (kg · m$^{-3}$) |
| σ | normal stress (MPa) |
| τ | shear stress (MPa) |
| χ$_{reg}$ | fraction of heat that is regenerated |
| Subscripts | |
| ads | adsorbent |
| avail | available |

| | |
|---|---|
| conv | convection |
| cond | condenser or conduction |
| evap | evaporator |
| exh | exhaust |
| f | liquid ("fluid") refrigerant |
| g | gaseous (vaporous) refrigerant |
| HTF | heat transfer fluid |
| in | inlet or inner |
| intake | intake air to engine |
| long | longitudinal |
| out | outlet or outer |
| r | refrigerant |
| s | solid, or surface of tube or flow passage |
| trans | transverse |

3. Conceptual Design of and Innovations for Adsorbers 3.1 Adsorption Cycle as Applied to an Automobile With a single adsorber, cooling is intermittent, which is undesirable because it wastes much of the continuous supply of exhaust heat. So, at least two adsorbers are needed for an automobile. Multiple adsorbers beyond two can enhance $COP_C$ by permitting incrementally more effective "thermal wave" regeneration [21], but add volume and mass, decreasing SCP. Thus a compromise must be struck between SCP versus $COP_C$ to satisfy constraints on both.

$COP_C$ must be high enough to ensure adequate cooling even for the worst case scenario of a subcompact car idling for an extended duration (i.e., traffic jam), since it has the largest ratio of cooling load to exhaust heat. Maintaining an already surge cooled cabin at a comfortable temperature requires 1.7 kW cooling (FIG. 1). Assuming a realistic 80% of the 3.5 kW available exhaust heat can be extracted (2.8 kW), the required $COP_C$=1.7 kW÷2.8 kW≈0.60, which can be accomplished with uniform temperature "double effect" heating.

Switching each adsorber from cooling to heating and vice versa incurs some degree of time lag and reduction in $COP_C$, because the temperature gradient from HTF to internal metallic heat exchanger to adsorbent must be reversed. This effect can be quantified and further discussion is deferred to the detailed thermal analysis in Section 8.1.4.

For a given configuration, SCP and $COP_C$ are inversely proportional. But both SCP and $COP_C$ are directly proportional to NTU and inversely proportional to the fraction of "dead" mass. Thus, the fundamental objectives are maximizing NTU and minimizing dead mass.

3.2 Conceptual Design Options

Two configurations have been devised. Option One employs direct heating and cooling of the adsorbers by exhaust and fresh air. Option Two utilizes indirect heating and cooling of the adsorbers by a liquid HTF (oil) which has been heated by exhaust and cooled by fresh air in a pair of finned tube, compact heat exchangers similar to an automotive radiator.

The adsorbers are shell-&-tube type, which is readily manufactured, cost effective, can withstand the relatively high operating pressure if ammonia is the chosen refrigerant, and incurs proportionally low dead mass.

3.2.1 Design Option One: Adsorbers Directly Heated by Exhaust and Cooled by Air

Figure 11:
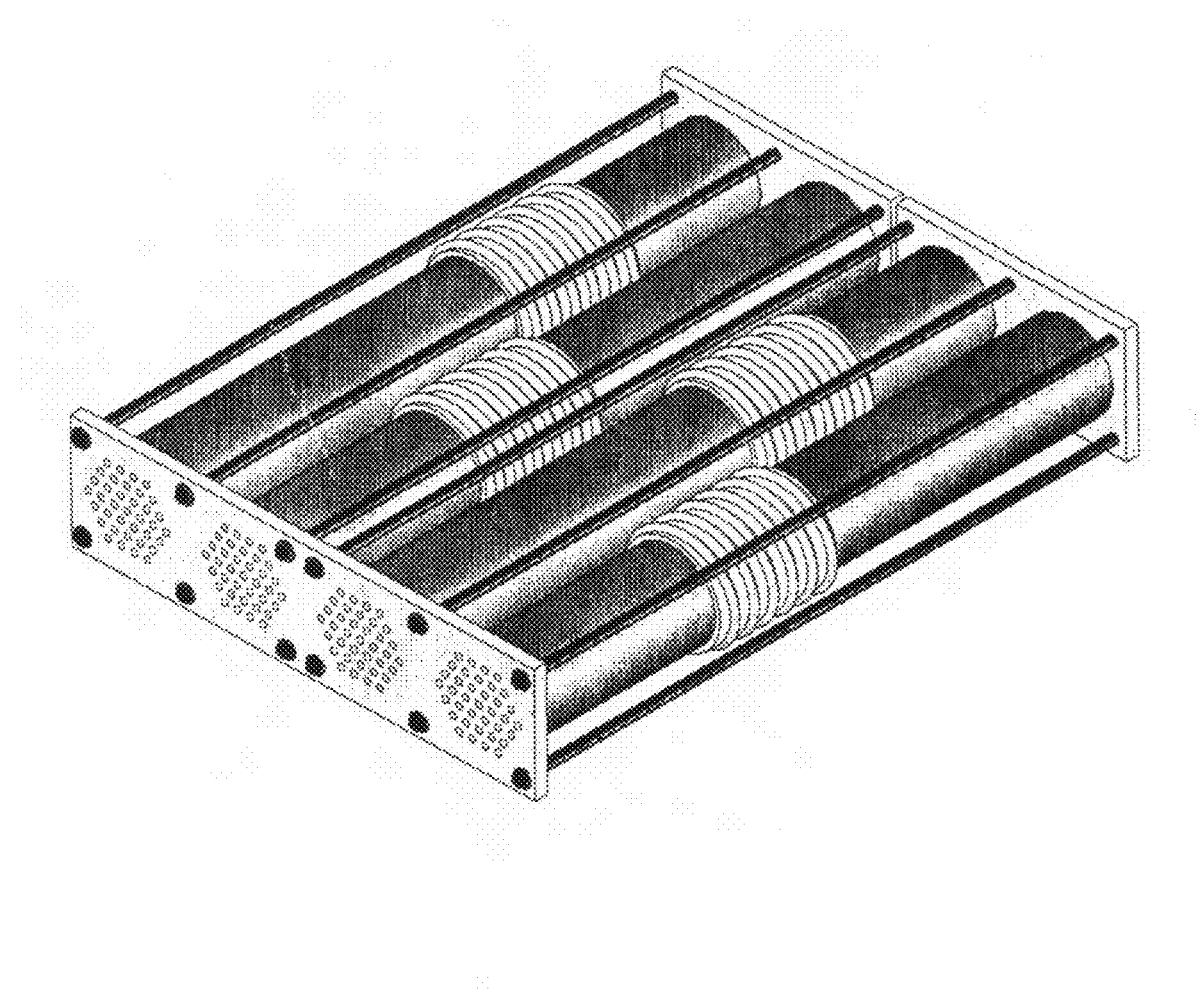
FIG. 11: Isometric view of design option one, showing mechanical details to counteract thermally induced stresses.

FIG. 11 shows four shell-&-tube adsorbers divided into two pairs. One pair is heated while the other pair is cooled. Hot exhaust or cool ambient air passes alternately through the small tubes to either heat or cool the adsorbent. The rear tube sheet is split at its center plane to allow for differential thermal expansion of the hot and cold adsorber pairs. The bellows of each shell allow for differential thermal expansion with respect to the exhaust/air tubes.

Figure 12:
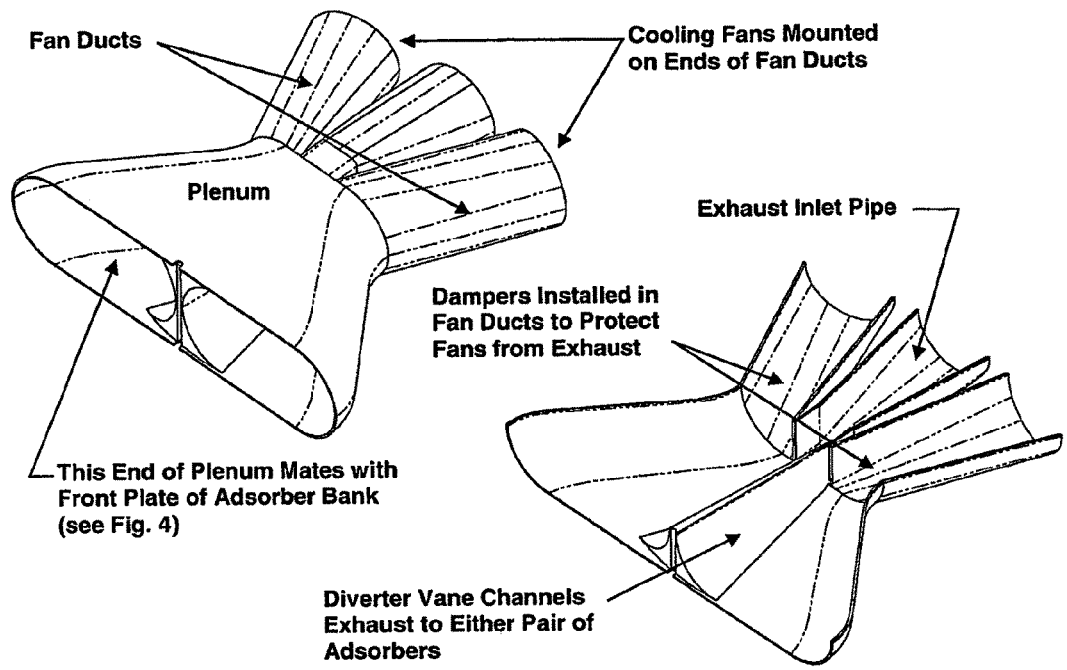
FIG. 12: Exhaust and fresh air ducting for design option one.

Option One requires large, complex ductwork for alternately routing exhaust through either pair of adsorbers and cooling ambient air through the other pair, as shown in FIG. 12. Each pair of adsorbers requires a cooling fan and a damper to protect the fan from exhaust.

3.2.2 Design Option Two: Adsorbers Heated & Cooled by Liquid Heat Transfer Fluid (HTF)

Figure 13:
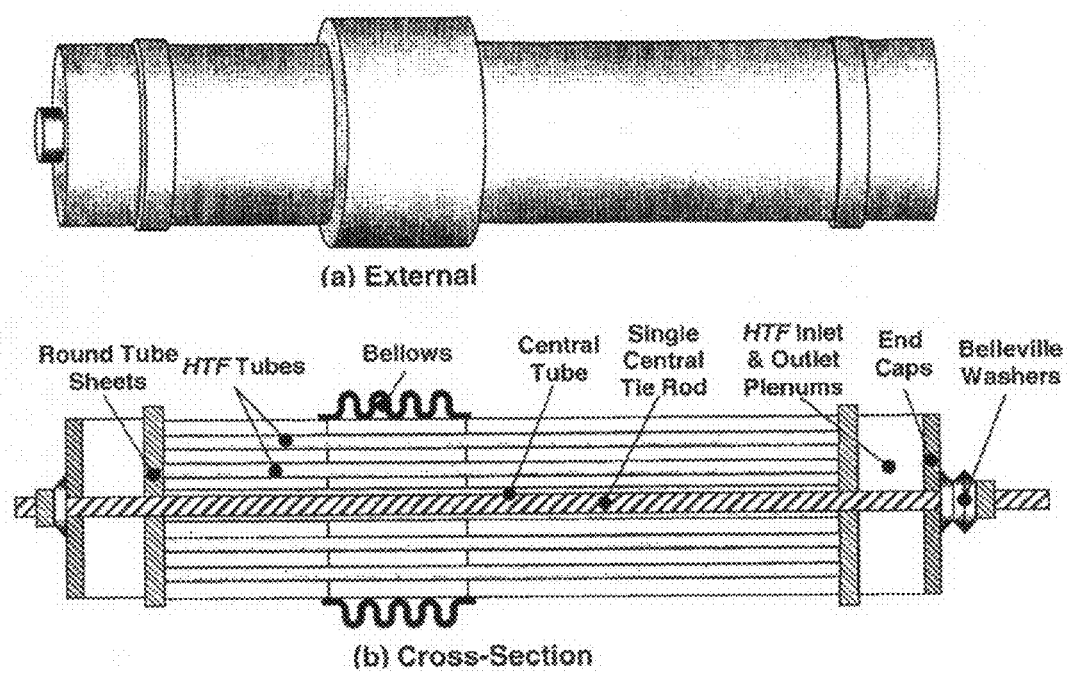
FIG. 13: Adsorber for design option two: (a) external, (b) cross section.

Instead of utilizing four shorter adsorbers linked together with plates and several external tie-rods as for Option One (FIG. 11), option two utilizes two longer adsorbers with circular end caps and one central tie-rod to bear the load of pressurization (FIG. 13). This configuration reduces dead mass. It also allows the sizeable assembly of Option One (four linked adsorbers, inlet and outlet ductwork, exhaust diverter vane, two fans, and two dampers) to be separated into smaller devices that can be fit more easily under the floor pan or in other locations.

Indirect heating and cooling via liquid HTF offers the following advantages:

Adsorbers can be cooled much closer to ambient by liquid HTF than by air, allowing them to adsorb more refrigerant.

Liquid HTF pump requires only a small fraction of the work of an air blower.

Heat can be stored in a thermal reservoir (e.g., wax).

Design Option Two was selected for its many advantages.

3.3 Innovations for Improving Performance Beyond the Current State of the Art

The present invention relates to simultaneously increasing both the adsorbent ("live") to inert ("dead") mass ratio $C_{ads}/C_{inert}$ as well as Number of Transfer Units (NTU). These two parameters were identified by a number of previous investigators as the critical factors governing performance (see Section 2.3). This increases both $COP_C$ and SCP.

One aspect of the present invention is that of "activating" the internal heat exchanger of the adsorbers. "Activating" means increasing the surface area to volume ratio, and is usually used to describe adsorbents, such as "activated" carbon, which is pulverized to achieve enormous surface area to volume ratio. In keeping with the notion of "activation," hundreds of thin metallic annular fins are helically wound around then brazed to the HTF tubes inside the adsorber shells (see FIGS. 12 and 13). The benefits are several:

(1) The metallic fins have thermal conductivity, $k_{fin}$, two to three orders of magnitude greater than the conductivity of the powdered or granulated non-metallic adsorbent, $k_{ads}$. So the fins efficiently conduct heat to and from all regions of the adsorbent.

(2) The higher conductivity of the fins with respect to the adsorbent allows for relatively wide spacing between the tubes inside the adsorber shell, thereby increasing the relative volume available for adsorbent and the ratio $C_{ads}/C_{inert}$.

(3) The annular fins are closely spaced, 2-3 mm apart, thereby possessing an order of magnitude greater surface area than the HTF tubes. This augmented surface or contact area, $A_{contact}$, counters the low junction conductance, $h_{junc}$, through the microscopic contacts and vapor filled gaps between the fins and the powdered adsorbent.

(4) An automotive adsorber will be subjected to shocks and vibrations which will eventually pulverize rather fragile consolidated adsorbent bricks into powder. These hundreds of fins will retain adsorbent powder, and even if some settling occurs over time, the fins will still effectively distribute heat to the adsorbent.

(5) In order to further increase (or "activate") the metal heat exchanger surface area in contact with the powdered or granulated adsorbent, metal wool is loosely packed between the metal annular fins (6-7% by volume, as compared with 4% in the as-received condition), forming an interwoven network of wire "pin" fins with myriad fin-wire and wire-wire contacts, which are then fused together. Alternatively, small (~3 mm) diameter coils of fine wire (100-150 μm), resembling the springs in retractable ball point pens, are helically wound between the annular fins. The diameter of these fine wire coils is slightly larger than the spacing between annular fins, so that the wire coils are lightly squeezed between the fins, ensuring myriad fin-wire contacts. If the tubes, external annular fins, and wire wool or wire coils are made of copper or steel, they are bonded by nickel plating which forms thermal bridges at the fin-wire and wire-wire contacts. If the tubes, fins, and wire wool or wire coils are made of aluminum, the myriad contacts can be diffusion bonded (i.e., slowly welded) in a furnace maintained ~100° C. below the $T_{melt}$ for a few hours.

(6) In effect, a given volume of adsorbent $\Psi_{ads}$ is spread very thinly over the enormous metal surface area $A_{contact}$, so that the distance from metal to any point in the adsorbent, $\Psi_{ads} \div A_{contact} = d_{max}$, is a fraction of a millimeter. This drastically reduces bulk thermal resistance through the adsorbent. This design has an order of magnitude smaller value of $d_{max}$ than any of the earlier designs (Table 1).

(7) Since the contact area $A_{contact}$ is huge and the conduction path through the adsorbent $d_{max}$ is tiny, the adsorbent does not require consolidation to increase $k_{ads}$ or $h_{junc}$. This also avoids the problem of severely reduced (by a factor of $10^{-3}$ to $10^{-4}$) vapor permeability due to consolidation. As-received adsorbent powder or granules are simply poured in and vibratory compacted to about 50% porosity, a readily achievable target.

(8) Spreading the metal internal components very thin so as to increase their surface area also reduces their required volume and mass. This increases the ratio of adsorbent ("live") to inert ("dead") mass, $C_{ads}/C_{inert}$, the second of the two critical performance parameters.

(9) Transverse (radial) resistance $R_{trans}$ through the tube walls, fins, wire wool or wire coils, and thinly spread adsorbent is many times smaller than longitudinal resistance $R_{long}$ along the thin-walled HTF tubes. Thus heat flow is preferentially transverse, giving rise to a significant longitudinal temperature gradient and thereby permitting "thermal wave" regeneration.

(10) Copper wool can be loosely packed inside the HTF tubes (approx. 10% by volume) to enhance convective heat transfer from the HTF to the wall by a factor of 3-4.

(11) A better performing, though somewhat more expensive, alternative to copper wool is available. Asterisk shaped extrusions with 6 to 12 "spokes", of aluminum, copper, or carbon steel, are swaged into pre-tinned HTF tubes, after which the assemblies are heated in an inert gas filled oven to melt the brazing metal and fuse the fins to the tubes (see FIG. 14). These asterisk shaped inserts divide the single large round flow passage into multiple wedge shaped lumens, reducing the hydraulic diameter $D_h$ by a factor of 3-5. The "spokes" increase internal surface area in contact with the HTF by a factor of 2-4 and serve as radial fins to efficiently transfer heat to/from the HTF. Thus, internal radial fins can increase convection by an order of magnitude or more. Although multiple lumens are not a new concept, usually only 4-6 are used or they are foregone altogether to reduce pressure drop $\Delta P$ and associated pumping power. However, the HTF flow rate of this design is low, so $\Delta P$ is not a problem.

(12) Phase change material (PCM) such as wax, zinc, or lithium will be used to store exhaust heat when the engine is running above idle. This stored heat will be used after the engine is shut off to desorb all refrigerant from the adsorbers for storage in the refrigerant reservoir in order to provide cooling immediately after start up of a cold engine.

Figure 9:
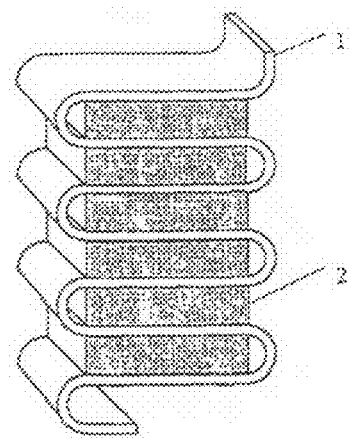
FIG. 9: Serpentine flat-pipe HEX interleaved with tiles of consolidated zeolite adsorbent that was devised by Tchernev et al. [7, 8].

The rather expensive shell bellows (FIGS. 9 and 11) are omitted in lieu of an internal telescoping HTF plenum (FIG. 14) that allows for differential thermal expansion between the tubes and shell.

These enhancements [(1) shell-&-tube HEX with annular helical fins on the HTF tubes, (2) metal wool loosely packed between the fins or fine wire metal coils wound between the fins, (3) metal wool or radial fins inside the HTF tubes, and (4) phase change material] for increasing both $COP_C$ and SCP are not described in any of the literature. These enhancements are also applicable to any adsorption cooling or heating application including, but not limited to: NASA's proposed permanent manned lunar habitat; residential, commercial, industrial, and agricultural heat pumps and chillers; other transportation systems such as refrigerated trucks and trailers, buses, trains, and ships.

4. Embodiment Design of Automotive Adsorption Heat Pump 4.1 System Layout

Figure 16:
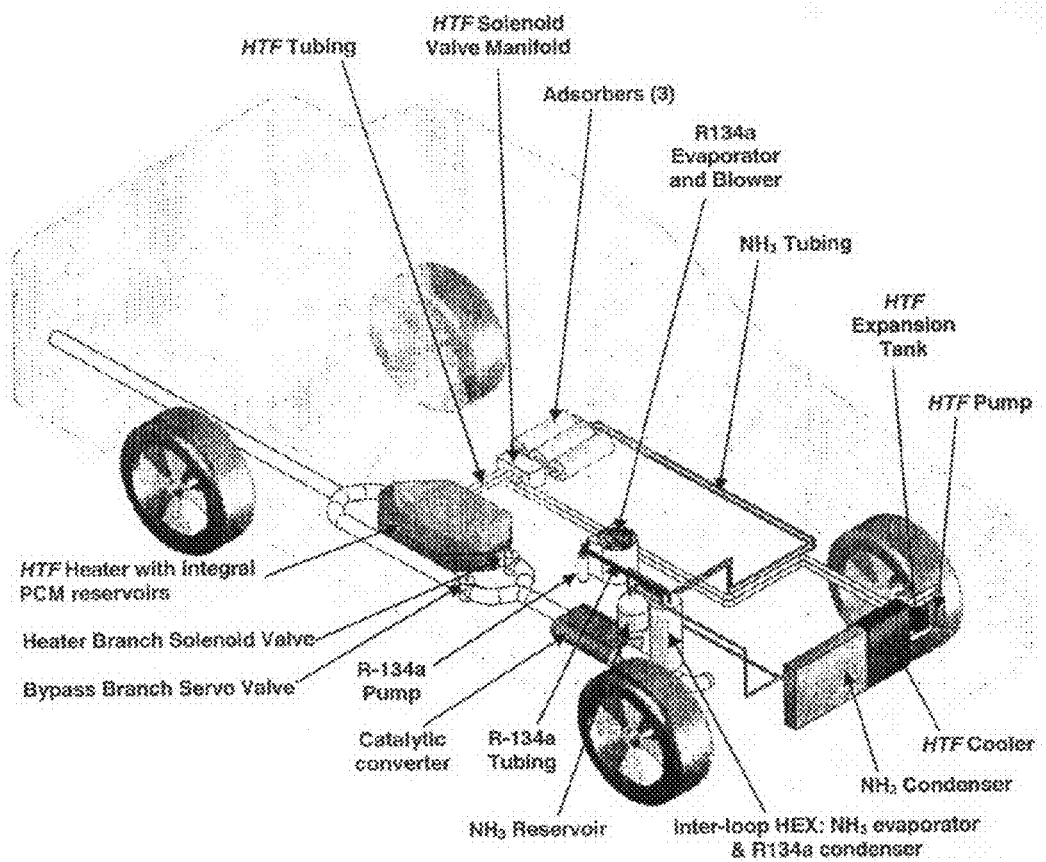
FIG. 16: Layout of exhaust powered automotive adsorption heat pump.
Figure 17:
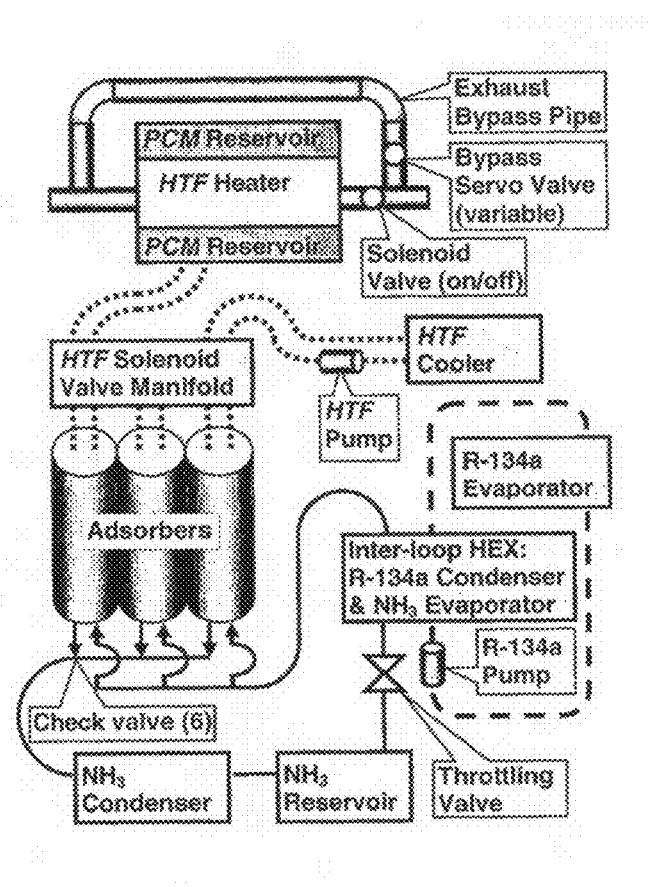
FIG. 17: Schematic diagram of exhaust powered automotive adsorption heat pump.
Figure 18:
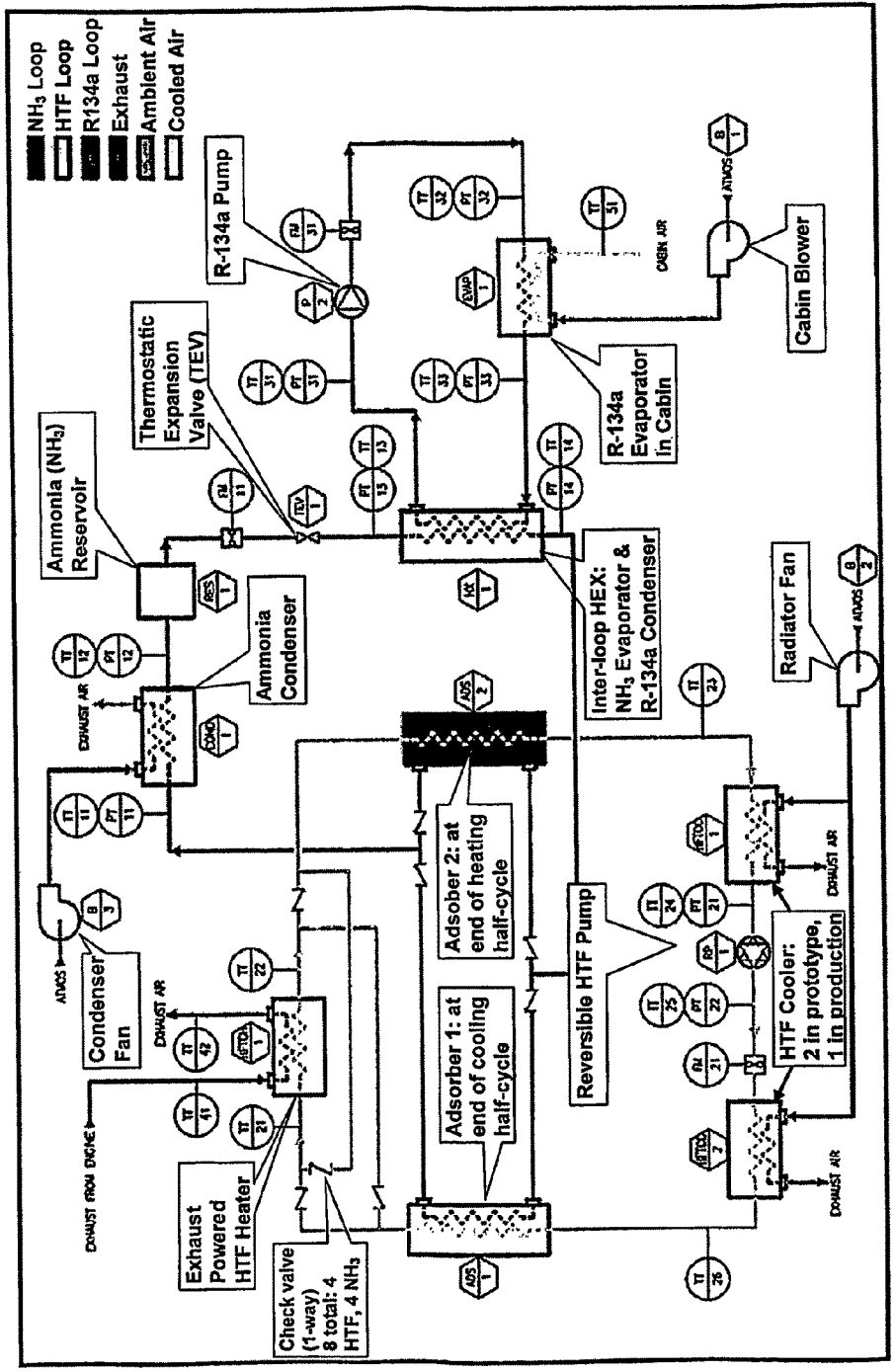
FIG. 18: Schematic diagram of exhaust powered automotive adsorption heat pump. Major components are labeled. Each fluid stream is color-coded as indicated in the legend. Sensors are indicated by the various circles containing the acronyms FM (flow meter), PT (pressure transducer), and TT (temperature transducer) over numerals, most of which are used for the prototype and not on a production model.

The adsorption cooling system is depicted as integrated into an automobile in FIG. 16. FIG. 17 is a basic schematic diagram of the system, and FIG. 18 is a detailed schematic of the prototype mounted on a cart. The system is comprised of three circuits, an HTF loop, an ammonia ($NH_3$) or methanol ($CH_3OH$) adsorption loop entirely exterior to the passenger cabin, and an R-134a refrigerant loop transferring heat from the cabin to the exterior $NH_3$ (or $CH_3OH$) loop. The R-134a loop can be eliminated by pumping $NH_3$ or $CH_3OH$ directly through the evaporator inside the dash. Safety valves installed in the refrigerant tubing would close automatically in the event of a leak to prevent $NH_3$ or $CH_3OH$ from entering the cabin.

4.2 Component Descriptions and Functions

Adsorbers: Contain powdered or granulated adsorbent and are heated and cooled cyclically and asynchronously by hot and cold HTF to pump refrigerant to the condenser and suck it from the evaporator. Three adsorbers are shown in FIG. 16, rather than two. This allows for more effective heating and cooling as is shown quantitatively in Section 8.1.4 covering detailed design and analysis.

Heat Transfer Fluid Heater: This is a counter-flow heat exchanger wherein catalyzed exhaust heats HTF. It resembles an enclosed radiator with multiple serpentine tube banks. As in a typical radiator, the HTF tubes are oval shaped with thin corrugated fins between them. This design exerts low back pressure on the exhaust.

Thermal Reservoirs: Two thermal reservoirs store exhaust heat in PCM (e.g., wax, zinc, or lithium) for drying all adsorbers after the engine is shut off in order to fill the refrigerant reservoir. The reservoirs are thin-walled, steel boxes measuring approximately 40 cm×10 cm×3 cm, and are brazed to the outboard surfaces of the HTF heater manifolds.

Heat Transfer Fluid Cooler: This is a radiator that dissipates excess heat from the HTF to cool it near to ambient before it is pumped into the adsorbers being cooled at the moment.

Heat Transfer Fluid Pump, Tubing, and Expansion Tank: The small, low power HTF pump comes after the HTF cooler in the circuit, allowing for an inexpensive OEM fuel pump or engine oil pump for a very small engine. The HTF tubes are insulated. The expansion tank has an internal volume of about 0.6 liter. It is almost empty when the HTF is cold and nearly full when the heat pump is operating to make allowance for ~12% expansion of the HTF from ambient to mean operating temperature of ~160-170° C.

Exhaust Bypass Pipe & Control Valves: Exhaust exiting the catalytic converter ranges from 400° C. at idle, to 450-500° C. at city and highway cruise, to as high as 600° C. for sustained operation at full throttle under heavy load (e.g., uphill towing). Excess exhaust heat beyond that needed to operate the heat pump could overheat the HTF. The bypass pipe allows excess exhaust to be routed around the HTF heater. When the heat pump is on, a servo motor controlled butterfly valve in the bypass branch opens enough to tap off any excess exhaust. So, although exhaust may reach 600° C. in extreme cases, only a small flow rate of such very hot exhaust would be allowed through the HTF heater, not enough to overheat the HTF. When the heat pump is off and the HTF is stagnant, the bypass valve is wide open, and another solenoid controlled butterfly valve in the HTF heater branch is closed, preventing overheating.

The bypass branch also ensures that excessive back pressure will not result from trying to force all exhaust through the HTF heater at or near full throttle.

Refrigerant Reservoir: This contains sufficient refrigerant to provide immediate "surge cooling" during the initial 10 minute interval after start up of a cold engine, while the HTF is being heated in order to start thermally cycling the adsorbers and pumping refrigerant.

Condenser: This is identical in size and shape to current units, since likely adsorption refrigerants (e.g., $NH_3$ or $CH_3OH$) have much better thermal properties than R-134a.

Evaporator: This is identical to current units, since it also utilizes R-134a.

Figure 19:
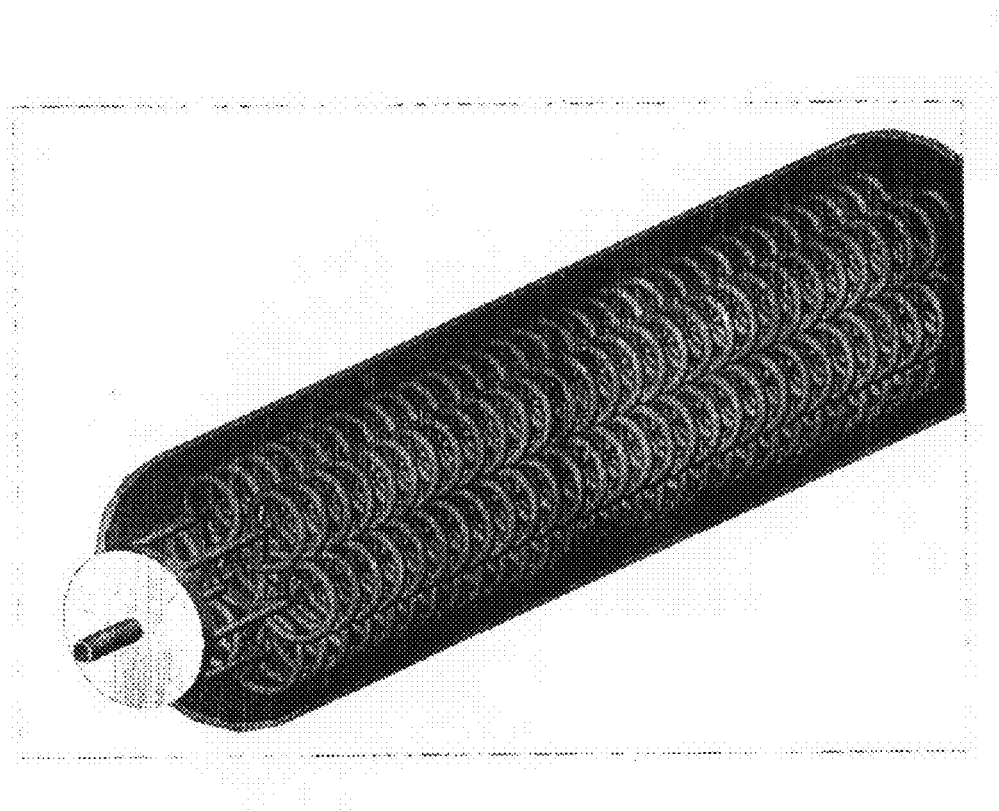
FIG. 19: Cutaway view of inter-loop heat exchanger. Adsorption loop refrigerant ($NH_3$ or $CH_3OH$) evaporates inside the coiled tubing, and R-134a condenses on the outside of the tubes.

Inter-loop Heat Exchanger: This can be omitted if it is decided to use a single refrigerant loop (e.g., $NH_3$ or $CH_3OH$). It can be either a shell-&-tube HEX with internal coiled $NH_3$ (or $CH_3OH$) tubing as shown in FIG. 19, or a plate type HEX. Either type will be small, since it employs two-phase heat transfer for both refrigerants (boiling $NH_3$ or $CH_3OH$, condensing R-134a). A small, very low power pump circulates R-134a through the nearly isobaric internal loop.

4.3 Cost Effective, Robust Design Elements

"Off-the-shelf" technology is employed for the condenser, evaporator, inter-loop heat exchanger, refrigerant reservoir, and HTF cooler, which are proven configurations with modest modifications to account for particulars of this application. The adsorbers have the readily manufactured, cost effective, shell-&-tube configuration, which offers high strength and low weight. The HTF heater resembles a finned tube radiator.

The adsorbers are cycled from ambient to ~300° C., hot enough to deplete any adsorbent (zeolite, carbon, or silica gel). The HTF heater is cycled from ambient to ~375° C., far enough above a maximum HTF temperature ~300° C. to promote effective heat recovery in a reasonably sized package.

Depending upon the choice of refrigerant (e.g., $NH_3$), the adsorbers could be subjected to high pressure. For steel alloys usually used in high temperature, high pressure applications, allowable stress at ~300° C. is only modestly reduced compared with allowable stress at room temperature, as per the ASME Pressure Vessel & Piping Code [30]. Choices of specific metal alloys for shell, tubes, fins, and wool are deferred to Section 5 after the refrigerant has been selected so as to include material compatibility along with considerations of thermo-physical properties, fatigue strength, creep resistance, manufacturability, and cost.

Manufacturing methods are all cost effective and yield durable products.

a. No "exotic" or uncommon, usually expensive, fabrication operations are involved.
b. Nearly all operations lend themselves to automation, and most tasks can be performed by semi-skilled labor. For example, components can be mass produced on common lathes and vertical mills (3-axis: x-y bed with z-direction tool head) or CNC milling machines.
c. All tolerances are relatively loose. For example the length of heat exchanger tubing inside the adsorbers need only be within ±2 mm of nominal, and holes in the end plates for accepting these tubes need be drilled only within ±0.25 mm.
d. "As received" finishes (e.g., machined, drawn, extruded) are suitable for all components, foregoing secondary operations such as grinding, lapping, and honing, which add cost.
e. Pressure vessel joints can be brazed in lieu of more expensive welding by skilled labor, although automated (robotic) arc welding of seams on adsorber shells may be more cost effective for high volume production.

Materials and parts are all commonly available, being produced in great numbers or bulk, and are inexpensive.

a. Adsorbents (zeolite, activated carbon, or silica gel) can be used in as-received, powdered or granulated form and require no special processing, such as consolidation into pellets or bricks, which sacrifices vapor permeability for higher thermal conductivity, trading one problem for another. Simple vibratory compaction to the desired porosity will suffice.
b. Heat exchanger tubing and shells can be constructed from inexpensive carbon steel or modestly more expensive low alloy steel or ferritic stainless steel. Austenitic stainless steel, at somewhat greater expense, is an option if higher corrosion resistance is required.
c. Medium to coarse grade metal wool and fine wire metal coils are inexpensive.
d. Simple, inexpensive, rugged ball check valves are used to regulate flow of refrigerant.
e. The HTF pump is a low pressure (<400 kPa), medium capacity (5 liter.min$^{-1}$) oil pump.
f. The R-134a pump is of lower pressure (<200 kPa) and capacity (1 liter.min$^{-1}$) than the HTF pump.

5. Material Selection

5.1 Adsorbent

Zeolites are alkali-alumino-silicate minerals containing myriad nano-pores in their open, cage-like crystalline lattices which permit them to adsorb large amounts of small, polar molecules, especially water [31, 32]. Zeolites have low k on the order of 0.1-1.0 $W.m^{-1}.K^{-1}$, which slows adsorption and desorption, thereby limiting SCP [7, 8]. The most adsorbent zeolite, type CaX, can adsorb 36%, 22%, and ≈30% (by weight) water, ammonia, and methanol, respectively, as shown in FIG. 20, which lists the adsorptivity, at atmospheric pressure and room temperature, of various chemicals in several zeolite types and a few other adsorbents.

The conductivity of activated (i.e., highly porous) silica gel ($SiO_2$) is similar to that of zeolites. Silica gel completely desorbs most refrigerants at or below 150° C., exhibiting a great affinity for methanol, adsorbing up to 50% by mass, much greater than its affinity for water (33%) or ammonia (13%) as shown in FIG. 20.

Graphite possesses very high k (1950 $W.m^{-1}.K^{-1}$ parallel to the lamellae, which resemble planar honeycomb structures, and 5.70 $W.m^{-1}.K^{-1}$ perpendicular to the lamellae). Another allotrope, carbon fiber, also has very high k of up to 1100 $W.m^{-1}.K^{-1}$. Graphite and carbon can adsorb 62% ammonia and 55% methanol [33], but very little water (see FIG. 20). Graphite and carbon exhibit surface adsorption, as opposed to zeolites which draw refrigerant molecules relatively deep (up to 100 μm) within their crystalline lattices. Activated or expanded graphite ("activated" and "expanded" meaning in the form of microscopic powder) and carbon fibers have an enormous surface area to volume ratio, enhancing their adsorptivity.

A coating of $CaCl_2$ binds with ammonia at lower temperatures and releases it higher temperatures, a complex compound (chemi-sorption) reaction to augment surface Van der Waals attraction and capillary condensation (physi-sorption) on the activated carbon. Vasiliev et al. [33] demonstrate that $CaCl_2$ coating on carbon fibers increases adsorptivity of $NH_3$ by ~35%.

A compacted or consolidated mixture of zeolites and activated graphite increases thermal conductivity and contact conductance to the metallic HEX [7, 8, 18-20, 22, 23]. Consolidation involves mixing the adsorbent with a binder, usually sodium meta-silicate (silica gel), followed by heating to drive off the solvent. However, permeability, as compared with a bed of spherical pellets, decreases by as much as a factor of $10^{-4}$ with increasing compaction and consolidation, severely impeding vapor transport. This suggests an optimal intermediate density.

In order to maximize SCP, the best adsorbent should have the greatest affinity for the chosen refrigerant. Activated graphite or carbon is selected since it absorbs far more ammonia, the chosen refrigerant as explained in Section 5.2 below, than any other desiccant.

5.2 Refrigerant

The ideal refrigerant should be chosen for the prescribed operating temperature range, $T_{evap} \approx 3°$ C. (if water, benign) or $-13°$ C. (if ammonia or methanol, hazardous), and $T_{cond} \approx 65°$ C. Corresponding vapor pressures must not be too high, requiring overly robust adsorber shell and tubing, nor sub-atmospheric, necessitating inordinately large evaporator and condenser and making the system prone to infiltration by air. As little as 1-2% non-condensable gas (air) "poisons" two-phase heat transfer, halving the heat rate in the condenser and evaporator. Relevant thermo-physical properties of some candidate refrigerants are in FIG. 21, and characteristics of more promising ones are described below:

a. Water is non-toxic, non-flammable, non-polluting, stable, and has the highest latent heat among common substances ($h_{fg}$=2257 $kJ.kg^{-1}@P_{atm}$). But, its vapor pressure is very low [$P_{cond}$=25 kPa at 65° C., and $P_{evap}$=0.8 kPa at 3° C], requiring large condenser and evaporator. Moreover, operating at sub-atmospheric pressure invites air "poisoning." Operating the evaporator at just a few degrees above the freezing point requires precise control, and the tubing must be drained to prevent bursting when idle in frigid weather.

b. Ammonia is toxic, flammable in some concentrations (16-25%), non-polluting, stable, and has the second highest latent heat ($h_{fg}$=1368 $kJ.kg^{-1}@P_{atm}$) among common substances. When throttled (isenthalpic) from a liquid at $T_{cond,out}$=60° C. to $T_{evap,in}$=−10° C., $\Delta h_{evap}$=958 $kJ.kg^{-1}$. Ammonia has $P_{cond,in}$=2948 kPa at 65° C., and $P_{evap,out}$=291 kPa at −13° C.

c. Methanol is toxic, highly inflammable, non-polluting, unstable beyond 393 K, and has the third highest latent heat ($h_{fg}$=1101 $J.kg^{-1}@P_{atm}$) among common substances. When throttled from 60° C. to −10° C., $\Delta h_{evap} \approx 1100$ $kJ.kg^{-1}$. $P_{cond,in}$=101 kPa at 65° C., but $P_{evap,out} \approx 3$ kPa at −13° C., so, "poisoning" by air is a possibility.

d. Ethanol is similar to methanol, but is surpassed by methanol in all relevant thermophysical properties. Ethanol also has sub-atmospheric operating pressures.

e. Propane is relatively non-toxic (irritating at high concentration, but can asphyxiate if it displaces too much $O_2$), highly inflammable, and non-polluting. It has practical operating pressures (>$P_{atm}$), but its thermal properties are inferior to $H_2O$, $NH_3$, and $CH_3OH$.

f. Carbon dioxide is also being explored as a refrigerant by some European automakers. It is non-toxic, non-flammable, and non-polluting. But it operates in a trans-critical cycle with very high $P_{cond} \approx 10,000$ kPa, requiring a thick-walled adsorber shell and tubing.

Ammonia possesses the combination of high adsorptivity in activated carbon or graphite, high latent heat, and practical super-atmospheric operating pressures that allow for compact condenser and evaporator, yet reasonably robust adsorbers, making it the best choice.

5.3 Pressure Vessel Metals

The highest operating temperature is 300° C. for an adsorber that is indirectly heated and cooled by HTF, design Option Two selected in Section 3.2. Mechanical and thermo-physical properties of several classes of metal alloys are summarized in FIG. 22.

a. Aluminum and its alloy have the fourth highest k (behind Ag, Cu, and Au). 2000 series aluminum alloys (e.g., the widely used 2024-T4, -T6, or -T8) retain strength at elevated temperature better than other series (3000, 5000, 6000, 7000, and 8000), but even 2000 series have very little strength at 300° C. Ammonia is slightly corrosive to corrosive on aluminum [34], and anodization cannot guarantee protection.

b. Copper has very high k (second only to Ag), but its alloys (brass and bronze) have only about ¼ the k. Copper and its alloys have high thermal mass ($C = \rho \times c_p$) and lack the strength and creep resistance at 300° C. necessary to make them viable for the pressure vessel. Copper is also rather expensive. Moreover, ammonia is highly corrosive to copper and its alloys [34], and nickel plating cannot assure protection.

c. Of the three classes of stainless steels, martensitic types (e.g., alloy 410) exhibit the highest $S_y$ at 300° C. and highest k but are least corrosion resistant. Ferritic types (e.g., alloy 446) have relatively high k for stainless alloys, high $S_y$ when heat treated, and cost less than austenitic and martensitic types. Ferritic grades are used in exhaust systems. Austenitic alloys (e.g., alloys 304 and 316) have lowest k and low $S_y$, but are the most corrosion resistant and are impervious to ammonia [34].

d. Annealed, low carbon steels (e.g., SAE 1010) have the highest k of ferrous alloys and modest $S_y$ when heat treated. Low alloy steels (e.g., "workhorse" alloys 4130 or 4340) have nearly equal k and much higher $S_y$, retaining nearly all their room temperature strength at 300° C. Both plain (carbon) and low alloys steels exhibit good fatigue strength and can endure long-term, cyclical pressurization of the adsorbers. Ammonia is very slightly corrosive to mild (low carbon) steel [34]. Galvanization is infeasible, since $NH_3$ is highly corrosive to zinc. So nickel plating may be needed for long-term protection.

Thus, if $NH_3$ is the chosen refrigerant, only ferrous alloys are feasible for the adsorber: shell, HTF tubes, annular fins, and wool, anything that comes into contact with ammonia. Stainless steel 304 (SS304, austenitic, 18% Cr, 8% Ni) is selected for the shell and HTF tubes, i.e., the pressure envelope. Annealed low carbon steel (SAE 1010) is used for the annular helical fins and wool or wire coils, since it has the highest conductivity of ferrous alloys, thrice that of SS304 (k=53.5 versus 16.8 $W.m^{-1}.K^{-1}$). SAE 1010 is also relatively soft and easily formed.

The assembled tubes, fins, and wool or wire coils are electroplated with nickel, or electro-less nickel ($Ni_3P$), forming thermal bridges at the myriad fin-wool and wool-wool contacts, thereby creating an interwoven network of heat transfer paths that effectively distribute heat to every portion of adsorbent. The nickel plating also limits very weak corrosion of the non-structural fins and wool or wire coils to the small proportion of inevitable pinholes.

The tubes and shells are brazed to the end plates with nickel-silver alloy (melting point ~650° C.) that is compatible with $NH_3$ and has shear yield strength $S_{y,s}$>300 MPa.

5.4 Heat Transfer Fluid (HTF)

Some mineral oil based HTF, e.g., Dow-Therm A [35], can be used up to 400° C., far above the maximum foreseeable operating temperature of 300° C. And at 300° C. they have modest vapor pressures of only a few atmospheres ($P_{sat,HTF}$≈2-3 $P_{atm}$). The low flow rate of HTF requires only another atmosphere or two of pressure differential to overcome pumping losses ($\Delta P_{pump,HTF}$≈1-2 $P_{atm}$). Thus, HTF gauge pressures are only 2-3 $P_{atm}$ and heater tubes and manifolds are subjected to only a small fraction of their allowable stress even at elevated temperature.

6. Functional Requirements

Functional specifications estimated in Section 1.2 (surge cooling capacity of 5 kW) and Section 3.1 ($COP_C$≈0.60) for a subcompact car, the type of vehicle with the most demanding performance requirements, are applied to sizing adsorbers, refrigerant reservoir, and HTF heater.

6.1 Operational Scenario and the Requirement for a Refrigerant Reservoir

Two of the most important design criteria for the adsorber are the amount of refrigerant required to run the desired cycle, which is based on $\Delta h_{evap}$ for $NH_3$, and the amount of adsorbent required to adsorb and desorb the ammonia at the required rate flow rate $\dot{m}_r$.

As described in Section 1.2, cooling a car that has been sitting in the sun for several hours (called "hot soaking") to a comfortable temperature requires nominally $\dot{Q}_{cool}$=5 to 7 kW of cooling for 10 minutes [3, 4]. The "hot soak" scenario also assumes the engine is "cold," i.e., left off for several hours. Mechanical compressors run continuously only during this initial 10 minute cool down period on hot summer days. Once the cabin is cool, about ⅓ of full capacity or $\dot{Q}_{cool}$=1.7 to 2.3 kW, is needed to maintain cabin comfort, depending upon thermostat setting and ambient temperature and humidity. Table 1 lists the additional power required by the mechanical compressor and the exhaust heat that could power an adsorption heat pump.

It is assumed herein that 5 minutes are required after a cold start to heat the exhaust piping, catalytic converter, HTF heater, and HTF sufficiently to begin heating the adsorbers. Therefore, a refrigerant reservoir is required to meet the demand for surge cooling (5 kW for 10 minutes for a subcompact car) while the exhaust system and heat pump are warming up. The reservoir is situated in the refrigerant circuit between the condenser and the thermostatic expansion valve or capillary tube (FIGS. 15 and 16), and contains pressurized liquid ammonia.

6.2 Required Cooling Capacity of Adsorbers

The adsorbers should not only maintain comfort in an already surged cooled cabin, requiring $\dot{Q}_{cool}$=1.67 kW for a subcompact car (FIG. 1), but must also recharge the refrigerant reservoir within a reasonable amount of time to ensure it is full when the engine is turned off. It is assumed the reservoir is emptied within 10 minutes after startup, beyond which surge cooling is no longer needed. Subtracting the aforementioned 5 minute delay for warm up after a cold start from a typical 20 minute commute (Section 1.1) means the heat pump would operate 15 minutes while the engine is running, during which the reservoir would be recharged.

The refrigeration required to surge cool the cabin (5 kW) and maintain comfort (1.67 kW) for a subcompact car over the 20 minute commute is (5 kW×10 min.)+(1.67 kW×10 min.)=66.7 kW-min. If the reservoir is to be replenished at the end of the commute, then the adsorbers must provide 66.7 kW-min. of cooling while they operate (15 minutes). Thus the adsorbers must have a capacity of 66.7 kW-min.÷15 min.=4.45 kW.

The liquid HTF system with a PCM thermal storage reservoir permits residual heat to be used to desorb refrigerant from the adsorber that is saturated when the ignition is turned off. This allows the heat pump to operate an additional 5 minutes or so at full cooling capacity, 20 minutes total. Thus the adsorber output must be 66.7 kW-min.÷20 min.=3.33 kW.

During the initial 10 minute surge cooling interval, 50 kW-min. of cooling is required. The heat pump operates during the latter half of this interval, after the initial 5 minute delay to heat the exhaust system. So, the adsorption heat pump produces 5 min.×3.33 kW=16.7 kW-min. of cooling during the 10 minutes after starting a cold engine. The refrigerant reservoir must store enough refrigerant to make up the difference between demand (50 kW-min.) and supply (16.7 kW-min.) during the 10 minute surge cooling interval, which is $Q_{cool,reservoir}$=33.3 kW-min.=2000 kJ. The amount of ammonia in the full reservoir is:

$$m_{r,reservoir} = Q_{cool,reservoir} \div \Delta h_{evap} = (2000 \times 10^3) \div (958 \times 10^3) = 2.09 \text{ kg} \qquad (2)$$

At 60° C., $\rho_r$=0.545 kg.liter$^{-1}$, so the reservoir must have a volume of 3.83 liters.

Compact and midsize cars would require 20% and 40%, respectively, more ammonia than the subcompact (hybrid) car examined above (see FIG. 1).

6.3 Required Amount of Adsorbent

Figure 23:
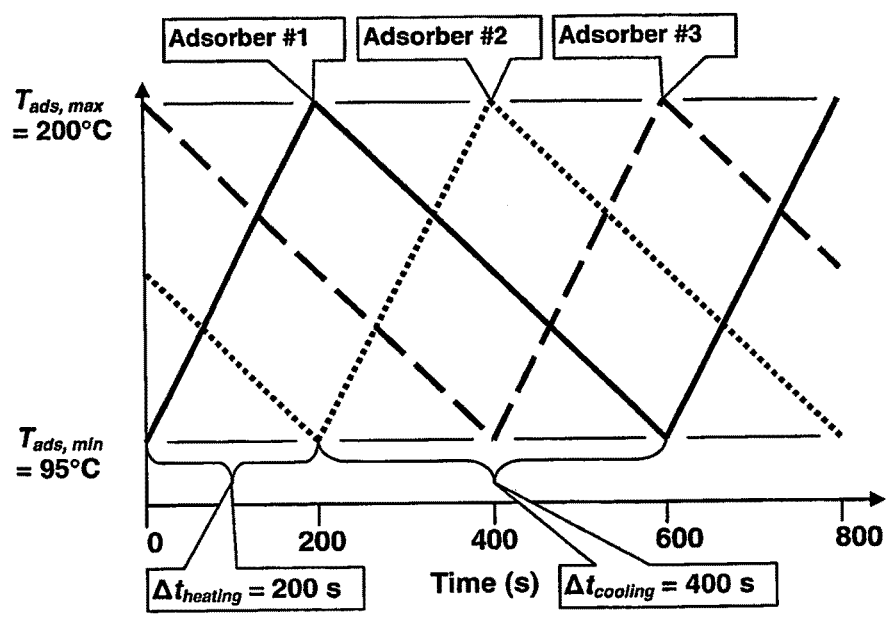
FIG. 23: Temperature versus time for the adsorbent in the 3 adsorbers. At any instant, one adsorber is heated while two are cooled. The cycle period is 10 minutes.

Three adsorbers, instead of two, may be employed to take advantage of the fact that minimum 400° C. exhaust (at idle) can rapidly heat one adsorber, permitting the other two to be cooled twice as long at half the rate (FIG. 23). A cooling rate that is ½ the heating rate incurs ½ the $\Delta T_{HTF\text{-}ads}$ so that the adsorbent can be cooled closer to ambient and adsorb more $NH_3$.

Cycle duration is set at 10 minutes and is divided into thirds. Each adsorber is heated for ⅓ of the cycle ($\Delta t_{heating}$=3.33 min.=200 s) and cooled for the remaining ⅔ of the cycle ($\Delta t_{cooling}$=6.67 min=400 s). Their phase angles are evenly spaced at 0°, 120°, and 240°, so at any given instant, one adsorber is being heated, while two are being cooled. (FIG. 23).

The amount of $NH_3$ that must be expelled from each adsorber during its heating phase is:

$$m_r = \dot{Q}_{cool} \times \Delta t_{heating} \div \Delta h_{evap} = 3330 \times 200 \div (958 \times 10^3) = 0.696 \text{ kg} \quad (3)$$

Dry activated carbon fiber at 25° C. can be saturated with up to 62% $NH_3$ (FIG. 20) after 120 minutes [33]. Adding a $CaCl_2$ coating boosts adsorptivity to 85% $NH_3$ [33] (Section 5.1). The dynamic adsorption capacity is 32% at 25° C. for a 10 minute cycle (adsorption/desorption) without $CaCl_2$, and 44% with $CaCl_2$. Carbon and $CaCl_2$ begin desorbing $NH_3$ above 50° C.

The minimum practical adsorption temperature is $T_{ads,min}$=95° C., which is high enough above the highest foreseeable $T_{amb}$=50° C. to permit adequate heat rejection during the cooling phase. At 95° C., the dynamic capacity of activated carbon fiber is 24% without $CaCl_2$ ($mf_{max}$=0.24) and 32% with $CaCl_2$ ($mf_{max}$=0.32). Carbon/$CaCl_2$ are depleted of $NH_3$ at $T_{ads,max}$=200° C. ($mf_{min}$=0), well below $T_{exh,min}$=400° C. Therefore, in each adsorber, the amount of activated carbon $m_{ads}$ required to hold $m_r$=0.696 kg of $NH_3$ is:

$$m_{ads} = m_r/(mf_{max}-mf_{min}) = 0.696/(0.32-0.00) = 2.18 \text{ kg} \quad (4)$$

6.4 Safety Considerations

In the event of a leak or a rupture due to a collision, ammonia is only slightly flammable. A material safety data sheet (MSDS) [34] lists its flammability as 1 on a 0-4 scale (non-combustible=0 to highly inflammable=4), stating: "Slightly flammable in the presence of open flames and sparks. Narrow lower to upper flammability limits (16 to 25%) makes ignition difficult." Its auto-ignition temperature is quite high, 651° C.

But $NH_3$ is a hazard; concentrations above 200 ppm cause severe irritation to mucous membranes. However, ammonia is highly volatile and its vapor is only 60% as dense as air, meaning any escaping vapor would dissipate very rapidly in the event of a collision. Moreover, the ammonia reservoir is a strong pressure vessel that can be further armored by enclosing it in a simple corrugated cylindrical steel canister capable of withstanding severe impact. The reservoir would be mounted in the engine compartment and separated from the cabin by the firewall. Also, the total quantity of ammonia needed (3.83 liters) is 8-10% of the typical capacity (40-50 liters) of a subcompact's gasoline tank.

7. Sizing Components

7.1 Adsorbers

The subcompact (hybrid) car presents the greatest design challenge, since it has the lowest ratio of exhaust heat $\dot{Q}_{exh}$ to required cooling capacity $\dot{Q}_{cool}$ at idle and cruising conditions (see FIG. 1). So this vehicle is used as the basis for sizing computations.

One of three identical adsorbers is illustrated in FIGS. 12 and 13. Their geometry is listed in FIG. 24. Each shell in made of thin-walled stainless steel 304 (SS304). It contains 19 SS304 tubes which are internally threaded to double their convective surface area. Fine copper wool is loosely packed into the tubes at 10% by volume. Alternately, extruded radial fins (resembling an asterisk) of annealed mild steel (SAE 1010) can be swaged and/or brazed inside smooth (unthreaded) tubes. Each tube has 120 external annular helical fins of annealed mild steel (SAE 1010). Steel wool (also SAE 1010) is loosely packed between the fins to 6% by volume (compared with 4% by volume as received) to create myriad fin-wool and wool-wool contacts, which are fused by electro- or electro-less nickel plating.

After subtracting the volume of the tubes, fins, and wool, each adsorber has $\Psi_{ads}$=1.997 liters of space to accommodate $m_{ads}$=2.18 kg of activated carbon as determined in Section 6.3. At full compaction $\rho_{ads}$=2.21 kg.liter$^{-1}$. But activated graphite is very porous, and must not be firmly compacted to maintain permeability. The total porosity, within individual particles and between particles in the aggregate, is:

$$\text{porosity} = (\Psi_{ads} - m_{ads}/\rho_{ads}) \div \Psi_{ads} = (1.997 - 2.18/2.21) \div 1.997 = 0.506 = 51\% \quad (5)$$

Adsorbers for the compact car and midsize car (FIG. 1) scale proportionately.

7.2 Refrigerant Reservoir and Inter-Loop Heat Exchange

The reservoir is a capsule, cylindrical with hemispherical caps, 152.4 mm in diameter and 300 mm long, and contains the needed 3.83 liters of $NH_3$ computed in Section 6.2.

Figure 14:
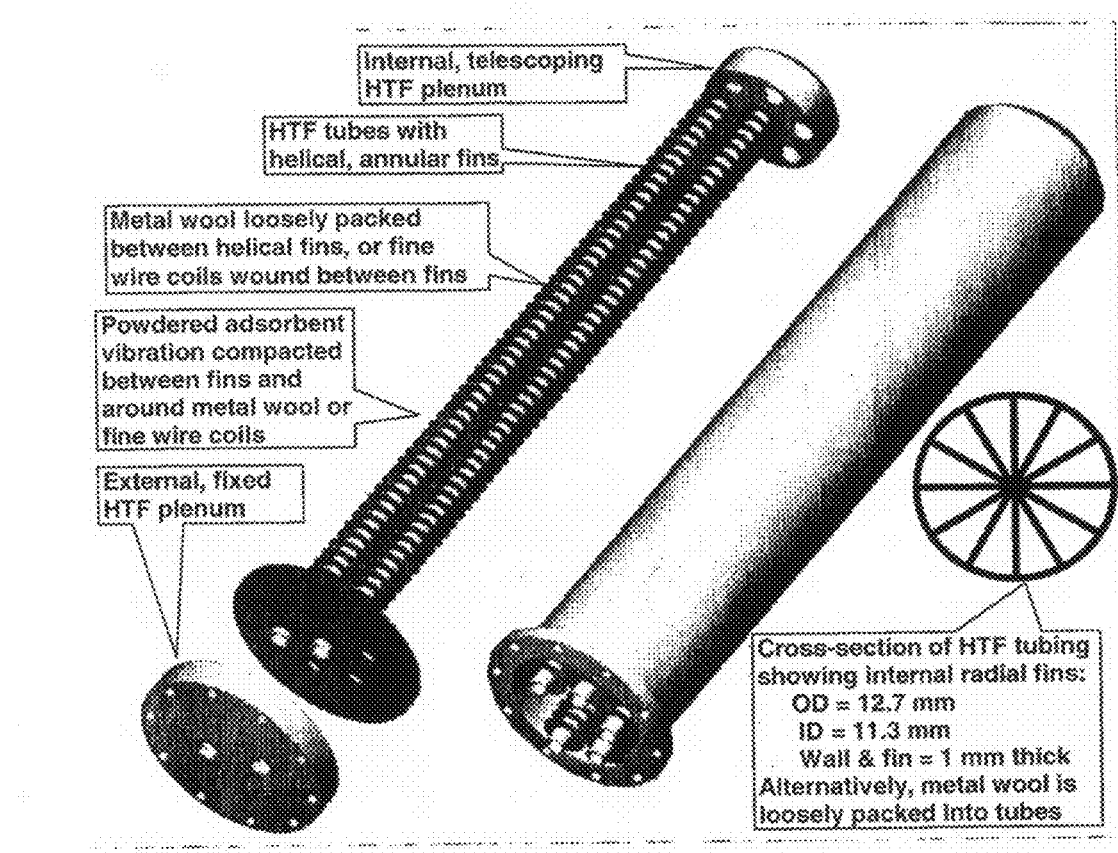
FIG. 14: Exploded view of an adsorber showing 7 helically finned HTF tubes, internal telescoping plenum to relieve thermo-mechanical stresses, and fixed external plenum. This application employs 19 HTF tubes, also in a regular hexagonal array.
Figure 15:
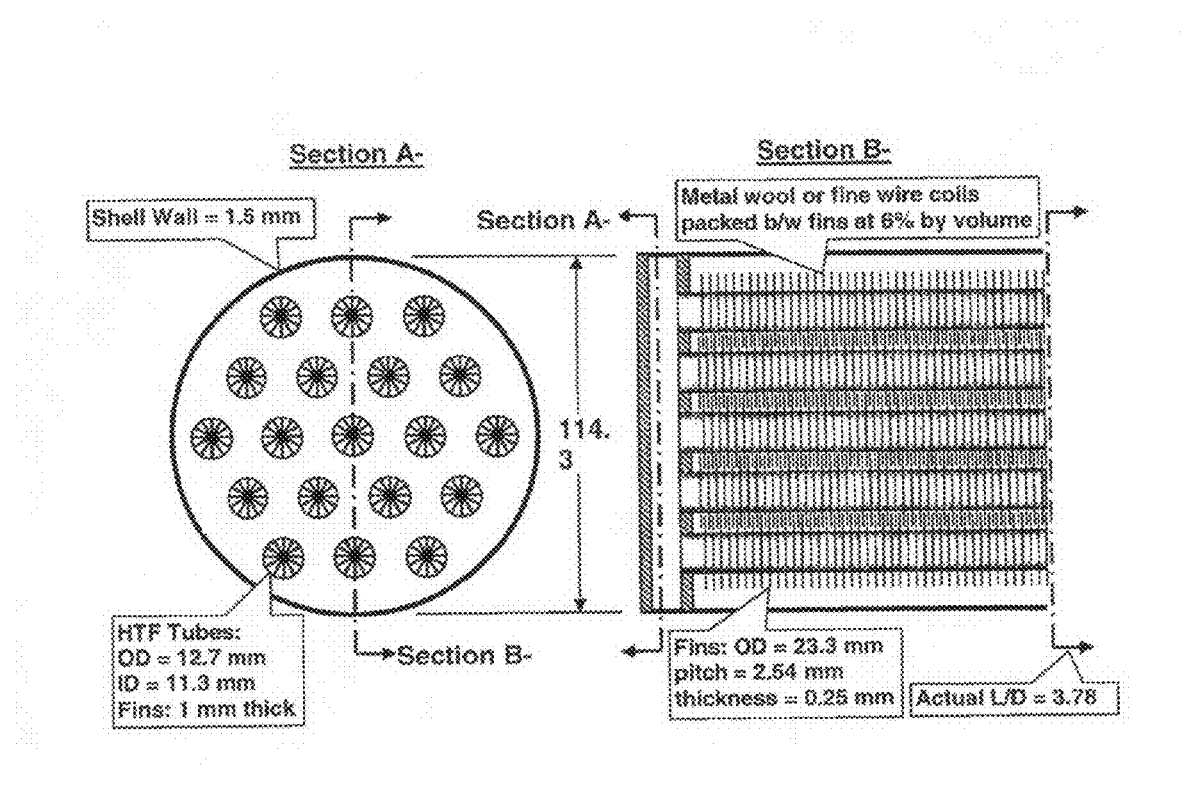
FIG. 15: Transverse and longitudinal cross-sections of adsorber. The longitudinal view is truncated; length to diameter ratio is 3.78. Proportions are accurate.

The inter-loop HEX (FIG. 19) links the $NH_3$ circuit to the R-134a circuit (FIGS. 14-16). It has a thin-walled cylindrical aluminum shell: 152.4 mm OD, 146.3 mm ID, $L_{shell}$=305 mm. It contains 7 coiled mild steel tubes (6.35 mm OD, 5.64 mm ID, $L_{tube}$=3.6 m), 30 turns each, in a regular hexagonal pattern. $NH_3$ evaporates inside the tubes, and R-134a condenses on the tubes.

The volume of the $NH_3$ reservoir and inter-loop HEX is comparable to the volume occupied by the compressor, its bracket, and the accumulator. But, neither of the adsorption components need be mounted on the engine, allowing greater flexibility in placement.

7.3 $NH_3$ Condenser, HTF Cooler, and R-134a Evaporator

At $T_{cond,in}$=65° C., $P_{cond,in}$ for $NH_3$ is 55% greater than for R-134a. And ammonia corrodes aluminum. So thin-walled mild steel or ferritic stainless steel tubing is used. Although $NH_3$ has six times higher k and $\Delta h_{evap}$ than R-134a, the condenser is the same size as current units, since air side heat transfer is unaffected, requiring the same fin area. The HTF cooler resembles the $NH_3$ condenser (both compact HEX), is about the same size, and is beside the $NH_3$ condenser in front of the radiator (FIG. 16). The R-134a evaporator inside the dash is unchanged.

8. Detailed Design & Analysis

8.1 Thermal Performance of Adsorbers

8.1.1 Temperatures

Adsorbent temperature limits are selected as $T_{ads,min}$=95° C. and $T_{ads,max}$=200° C. in Section 6.3. To ensure adequate cooling of the adsorbers, $T_{ads,min}$ is 35 K above $T_{HTF,min}$≈60° C., which is in turn 10 K above the highest foreseen $T_{amb}$=50° C. And $T_{HTF,max}$≈265° C. is 65 K higher than $T_{ads,max}$=200° C. to rapidly heat the adsorbent, yet still far below the minimum (at idle) catalyzed exhaust temperature of $T_{exh}$=400° C., so that the HTF can be heated in a reasonably sized HEX.

8.1.2 Available Heat

The subcompact (hybrid) car described in FIG. 1 provides the lowest ratio of exhaust heat $\dot{Q}_{exh}$ to required cooling capacity $\dot{Q}_{cool}$, so it is used as the basis for computations. Also, an idling engine (e.g., during a traffic jam) generates the least exhaust heat. FIG. 25 lists $T_{exh}$, $\Psi_{exh}$, and $\dot{Q}_{exh}$ for a subcompact car with a 1.5 liter engine for idling, city cruise, and highway cruise.

At idle, $\dot{Q}_{exh}$=3.5 kW when it is cooled from $T_{exh,in}$=400° C. to the dead state, herein taken to be the standard $T_{dead}$=25° C. The practical lower limit to which exhaust can be cooled is $T_{exh,out}$=100° C., since condensation (causing accelerated corrosion) will occur inside the exhaust system if it is cooled further. Thus, assuming constant $c_{p,exh}$, the available heat $\dot{Q}_{exh,avail}$ that can be extracted is:

$$\dot{Q}_{exh,avail} = \frac{(T_{exh,in} - T_{exh,out})}{(T_{exh,in} - T_{dead})} \times \dot{Q}_{exh} \quad (6)$$

$$= \frac{(400-100)}{(400-25)} \times 3.5 \text{ kW}$$

$$= 2.8 \text{ kW}$$

8.1.3 Required $COP_C$

The minimum $COP_C$ to maintain an already cooled cabin (at 33% duty cycle) for a subcompact car is $\dot{Q}_{cool} \div \dot{Q}_{exh,avail}$=1.67 kW÷2.8 kW=0.60, which is near the middle of the range of $COP_C$=0.50-0.65 achievable for uniform temperature heat recovery. Thus, for the most adverse operating condition conceivable, a subcompact car with the lowest ratio of $\dot{Q}_{exh,avail}$ to $\dot{Q}_{cool}$, idling for an extended length of time in a traffic jam, the adsorption heat pump can, if properly designed, maintain a cool cabin. Conversely, when a mechanical compressor is engaged on an idling engine, the throttle opens considerably to provide the additional 44% to 65% power required to turn the compressor (FIG. 1).

The most difficult design objective is minimizing the size and mass of the adsorber (i.e., maximizing SCP), while simultaneously enhancing $COP_C$ enough to provide sufficient cooling. A secondary concern is ensuring engine performance is not adversely affected by increased back pressure while recovering enough exhaust heat to power the heat pump. The compact car and midsize car (or SUV) have better (larger) ratios ratio $\dot{Q}_{exh,avail}$ to $\dot{Q}_{cool}$, requiring lower $COP_C$, making their designs somewhat less exacting.

8.1.4 Heat Transfer in Adsorbers

1. Refrigerant Flow Rate

For the adsorber being heated the $NH_3$ flow rate is:

$$\dot{m}_r = \dot{Q}_{cool} \div \Delta h_{evap} = 3{,}330 \div (958 \times 10^3) = 0.00348 \text{ kg.s}^{-1} \quad (7)$$

For each of the two adsorbers being cooled the flow rate is halved: $\dot{m}_r$=0.00174 kg.s$^{-1}$.

2. Thermal Masses

Adsorber geometry, mass, and thermal capacitance (or thermal "mass," C) are provided in FIG. 24. The mass fraction of adsorbed ammonia ranges from $mf_{max}$=32% at 95° C. to $mf_{min}$=0% at 200° C., for an average of $\overline{mf}$=16% at $\overline{T}_{ads}$=147° C. This corresponds to 0.349 kg of adsorbed ammonia with a thermal mass of 850 J.K$^{-1}$ at $\overline{c}_p$=2438 J.kg$^{-1}$.K$^{-1}$ (average of 2290 J.kg$^{-1}$.K$^{-1}$ at 95° C. and 300 kPa; and 2585 J.kg$^{-1}$.K$^{-1}$ at 170° C. and 2000 kPa). Thus, the total sensible thermal mass of each adsorber is the sum of the thermal masses of the solids: metal, adsorbent, and average amount of solidified refrigerant.

$$C_{solid} = m_{metal}c_{p,metal} + m_{ads}c_{p,ads} + 0.5(mf_{max}+mf_{min})$$
$$m_{ads}c_{p,r} = C_{metal} + C_{ads} + C_r \quad (8)$$

$$C_{solid} = 3507 + 2247 + 850 = 6604 \text{ J.K}^{-1} \quad (9)$$

3. Sensible and Latent Heat Rates

The total sensible heat rate for each adsorber during the heating phase is:

$$\dot{Q}_{sens,heating} = \frac{C_{solid} \times \Delta T_{ads}}{\Delta t_{heating}} \quad (10)$$

$$= \frac{6604 \times 105}{200}$$

$$= 3467 \text{ W}$$

The heat of adsorption is $h_{ads}$=1151 kJ.kg$^{-1}$. The latent (adsorption) heat rate per adsorber during the heating phase is:

$$\dot{Q}_{ads,heating} = \frac{m_{ads} \times (mf_{max} - mf_{min}) \times h_{ads}}{\Delta t_{heating}} \quad (11)$$

$$= \frac{2.18 \times (0.32-0) \times (1151 \times 10^3)}{200}$$

$$= 4015 \text{ W}$$

Therefore the total heat rate into the heated adsorber during the heating phase is:

$$\dot{Q}_{heating} = \dot{Q}_{sens,heating} + \dot{Q}_{ads,heating} = 3467 + 4015 = 7482 \text{ W} \quad (12)$$

4. HTF Flow Rate

The chosen HTF is Dow Chemical's Dowtherm A® synthetic (i.e., thermally stabilized) organic base oil with 400° C. limit [35]. At a mean of $\overline{T}_{HTF}$≈160° C.: $c_p$=1968 J.kg$^{-1}$.K$^{-1}$, $\rho$=943.3 kg.m$^{-3}$, $\mu$=0.54×10$^{-3}$ Pa.s, k=0.1163 W.m$^{-1}$.K$^{-1}$, $\nu$=0.57×10$^{-6}$ m$^2$.s$^{-1}$, Pr=9.1. At a tube surface temperature of about 250° C., $\mu_s$=0.28×10$^{-3}$ Pa.s.

The mean HTF flow rate through the heated adsorber is:

$$\overline{\dot{m}}_{HTF} = \frac{\dot{Q}_{heating}}{c_{p,HTF} \times \Delta T_{ads}} \quad (13)$$

$$= \frac{7482}{1968 \times (200-95)}$$

$$= 0.0362 \text{ kg.s}^{-1}$$

5. Convection in HTF Tubes $$Re_D = \frac{4\overline{\dot{m}}_{HTF}}{N_{tube}\pi D \mu} = 472 \quad (14)$$

There are 19 HTF tubes in each adsorber. Flow is laminar ($Re_D$<2300), for which $Nu_D$=4.36 for fully developed laminar flow in a circular tube with uniform surface heat flux. However, $Nu_D$ is boosted because the boundary layer is still developing even at the tube exit:

$$\overline{Nu}_D = 1.86\left(\frac{Re_D Pr}{L/D}\right)^{1/3} \left(\frac{\mu}{\mu_s}\right)^{0.14} = 10.4 \quad (15)$$

$$h_{HTF} = \frac{\overline{Nu}_D k_{HTF}}{D} = 128 \text{ W.m}^{-2}.K^{-1} \quad (16)$$

This value of $h_{HTF}$ is far too low and will severely limit heat transfer. The convection coefficient can be multiplied by inserting loosely packed bundles of fine copper wool in the tubes. The large surface area of the copper wool makes for effective heat transfer from the HTF to the wool, and the high conductivity of copper transmits heat to the walls of the tube. Experiments have demonstrated that 10% by volume of 00 gauge (40 μm fiber diameter) copper wool boosts the convection coefficient by a factor of ~4 to $h_{HTF} \approx 500$ W.m$^{-2}$.K$^{-1}$.

6. Efficiency of Annular Helical Fins and Wool "Pin" Fins

The annular, helically wound fins are annealed mild steel (SAE 1010) with $k_{fin}$=53.5 W.m$^{-1}$.K$^{-1}$ at 150° C. A conservative value of junction conductance $h_{junc}$=200 W.m$^{-2}$.K$^{-1}$ (See FIG. 10) is used for the contact between metal and activated carbon and gas gap conductance to ammonia vapor. The annular helical fins have an efficiency of $\eta_{fin} \approx 78\%$.

The wool "pin" fins are also of annealed mild steel (SAE 1010) and meander through the gap between adjacent annular fins making random wool-fin contacts. The length of each pin fin is estimated to be about twice the spacing between annular fins (2.29 mm), or ~5 mm, which should be conservative. The wool pin fins have $\eta_{pin} \approx 50\%$. The overall surface efficiency of tubes, annular fins, and wool is $\eta_0 \approx 59\%$:

$$\eta_0 = \frac{\eta_{tube}A_{tube} + \eta_{fin}A_{fin} + \eta_{pin}A_{pin}}{A_{tube} + A_{fin} + A_{pin}} = 0.586 \approx 0.59 \quad (17)$$

7. Conductance Through the Adsorbent

Loosely compacted, activated carbon filled with NH$_3$ vapor is assumed to have a conservative $k_{ads} \approx 1.0$ W.m$^{-1}$.K$^{-1}$ (see FIG. 10). Maximum distance from any point in the adsorbent to a metal surface is:

$$\delta_{ads} = \frac{\Psi_{ads}}{A_{tube} + A_{fin} + A_{pin}} \quad (18)$$
$$= \frac{1.997 \times 10^{-3}}{0.21 + 1.23 + 3.80}$$
$$= 0.00038 \text{ m}$$
$$= 0.38 \text{ mm}$$

8. Overall Transverse Conductance

The series resistance consisting of convection within the HTF tubes, conduction through the tube walls, annular fins, and wool, conductance across the metal-adsorbent interface, and conduction through the vapor filled adsorbent is:

$$R_{trans} = R_{HTF} + R_{tube} + R_{junc} + R_{ads} \quad (19)$$

$$R_{trans} = \frac{1}{h_{HTF}A_{conv}} + \frac{\ln(D_{out}/D_{in})}{2\pi kL} + \frac{1}{\eta_0 h_{junc}A_{junc}} + \frac{\delta_{ads}}{k_{ads}A_{junc}} \quad (20)$$
$$= 0.00795 \text{ K.W}^{-1}$$

The overall heat transfer coefficient is:

$$U \times A = R_{trans}^{-1} = 125.9 \text{ W.K}^{-1} \quad (21)$$

9. Transverse Conductance Versus Longitudinal Conductance

In order to ascertain whether the adsorbers are heated and cooled uniformly or non-uniformly via a "thermal wave," the longitudinal resistance is compared to the transverse resistance. The principal longitudinal conduction paths are the shell and tube walls, with cross sectional area $A_{cross}$=0.002126 m$^2$. Selecting a small segment of the adsorber, say 3% of its length, $R_{long}$ is:

$$R_{long} = \frac{0.03 \times L}{k_{tube \& shell}A_{cross}} \quad (22)$$
$$= \frac{0.03 \times 0.3048}{16.8 \times 0.002126}$$
$$= 0.256 \text{ K.W}^{-1}$$

For the same segment (3% of L), $R_{trans}$ is 1÷0.03=33.3 times larger than computed above in Equation (20); that is, $R_{trans}$=0.265 K.W$^{-1}$. Thus, $R_{long}$ and $R_{trans}$ are about equal over any given 3% segment of an adsorber. So, heat flow will be predominantly transverse. This will result in a longitudinal gradient as HTF flows through the tubes making for thermal wave regeneration, which can yield the greatest COP$_C$ (see Section 2.2).

10 Cooling Phase

Figure 26:
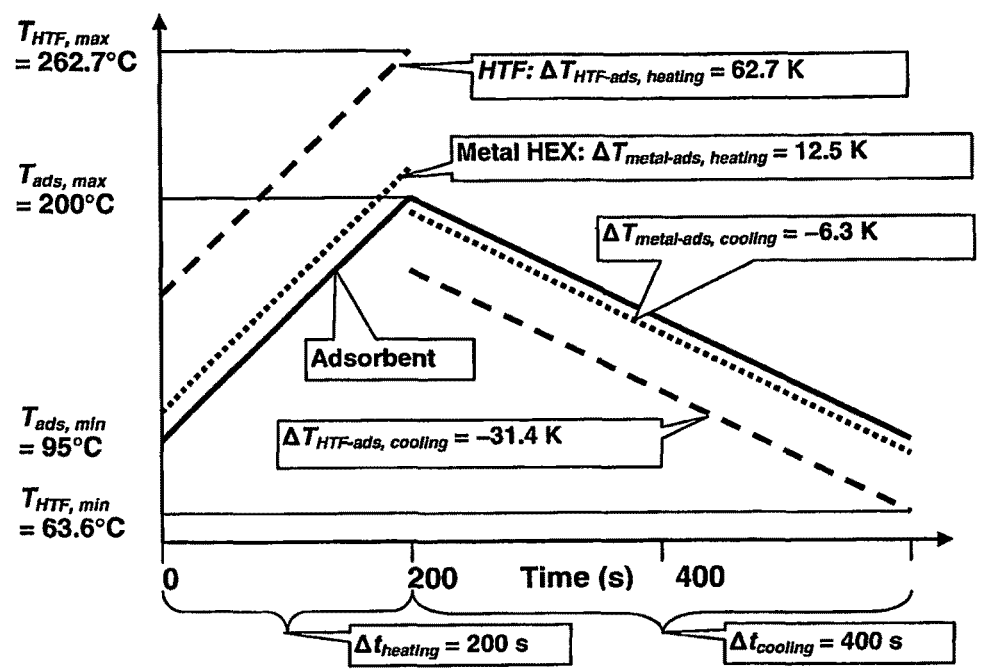
FIG. 26: Temperatures of HTF, adsorbent, and intermediary metallic HEX (tubes, fins, and wool) during heating and cooling phases, showing reversal of transverse temperature gradient from HTF to metal to adsorbent. Temperatures shown are for city cruise with corresponding $\dot{Q}_{cool}$=3.33 kW.

The two adsorbers being cooled are done so at half the rate of the adsorber being heated. So, over ⅓ of a cycle each of the cooled adsorbers changes temperature by $0.5 \times \Delta T_{ads}$=52.5 K (see FIG. 23). A cooling rate that is half the heat rate incurs half the $\Delta T_{HTF-ads}$ (see FIG. 26):

$$\dot{Q}_{sens,cooling} = \frac{-\dot{Q}_{sens,heating}}{2} \quad (23)$$
$$= \frac{C_{solid} \times (0.5 \times \Delta T_{ads})}{0.5 \times \Delta t_{cooling}}$$
$$= \frac{-6604 \times (0.5 \times 105)}{0.5 \times 400}$$
$$= -1734 \text{ W}$$

$$\dot{Q}_{ads,cooling} = -\frac{\dot{Q}_{ads,heating}}{2} \quad (24)$$
$$= -\frac{m_{ads} \times 0.5(mf_{max} - mf_{min}) \times h_{ads}}{0.5 \times \Delta t_{cooling}}$$
$$= -0.5\dot{m}_r \times h_{ads}$$
$$= -2007 \text{ W}$$

$$\dot{Q}_{cooling} = \dot{Q}_{sens,cooling} + \dot{Q}_{ads,cooling} \quad (25)$$
$$= -1734 - 2007$$
$$= -3741 \text{ W}$$

11. Transient Effects

When an adsorber is transitioned from heating to cooling or vice versa, the transverse temperature gradient from HTF to adsorbent must be reversed, which requires additional sensible cooling or heating of the intermediary metal HEX (tubes, fins, and wool). See FIG. 26. For a non-regenerative heat pump, the excess sensible heat in the metal of the hot adsorber is simply discarded, clearly reducing COP$_C$. But for a regenerative heat pump, excess sensible heat removed from the metal of the hot adsorber may be transferred to the cool adsorber. Although the excess sensible heat of the metal is recovered in a regenerative heat pump, the time lag involved in doing so diminishes $\dot{Q}_{cool}$, thereby reducing COP$_C$. Or, to maintain a given $\dot{Q}_{cool}$, greater $\dot{Q}_{make-up}$ must be added, also reducing COP$_C$, and resulting in larger $\Delta T_{HTF-ads}$.

Since the metallic components are at temperatures between $T_{HTF}$ and $T_{ads}$, reversing the transverse gradient does not require cooling the metal all the way from $+\Delta T_{HTF-ads}$ to $-\Delta T_{HTF-ads}$. For the current prototype, despite convection enhancements to counter low $k_{HTF}$, 73% of total thermal resistance $R_{total}$ is between the HTF and the tube wall, meaning only 27% of $R_{total}$ is between the tube wall and the adsorbent. So, $\Delta T_{metal-ads} \leq 0.27 \times \Delta T_{HTF-ads}$; it is actually 0.20×

$\Delta T_{HTF\text{-}ads}$ accounting for the temperature variation in the metal from tube inner wall to fins to wool. Since $\Delta T_{metal\text{-}ads}$ must be reversed (+ to −, or − to +), the change is 2×(0.20× $\Delta T_{HTF\text{-}ads}$). Every ⅓ cycle (200 s), the adsorber being heated is switched to cooling, and the colder of the two being cooled is switched to heating. At nominal $\dot{Q}_{cool}$=3.33 kW during city cruise:

$$Q_{transient,heating}=2\times0.20\times C_{metal}\times\Delta T_{HTF\text{-}ads,heating}=2\times 0.20\times3507\times59.4=83{,}300\text{ J} \tag{26}$$

$$\overline{\dot{Q}}_{transient,heating}=Q_{transient,heating}\div\Delta t_{heating}=83{,}300\div 200=417\text{ W} \tag{27}$$

$$Q_{transient,cooling}=2\times0.20\times C_{metal}\times\Delta T_{HTF\text{-}ads,cooling}=2\times 0.20\times3507\times29.7=-41{,}700\text{ J} \tag{28}$$

$$\overline{\dot{Q}}_{transient,cooling}=Q_{transient,cooling}\div(0.5\times\Delta t_{cooling})= -41{,}700\div(0.5\times400)=-208\text{ W} \tag{29}$$

12. Temperature Difference Between HTF and Adsorbent

The temperature differences between the HTF and adsorbent for heating and cooling are:

$$\Delta T_{HTF\text{-}ads,heating}=\frac{\dot{Q}_{heating}+\overline{\dot{Q}}_{transient,heating}}{U\times A} \tag{30}$$
$$=\frac{7482+471}{125.9}$$
$$=62.7\text{ K}$$

$$T_{HTF,max}=T_{ads,max}+\Delta T_{HTF\text{-}ads,heating} \tag{31}$$
$$=200+62.7$$
$$=262.7°\text{ C.}$$

$$\Delta T_{HTF\text{-}ads,cooling}=\frac{\dot{Q}_{cooling}+\overline{\dot{Q}}_{transient,cooling}}{U\times A} \tag{32}$$
$$=\frac{-3741-208}{125.9}$$
$$=-31.4\text{ K}$$

$$T_{HTF,min}=T_{ads,min}+\Delta T_{HTF\text{-}ads,cooling} \tag{33}$$
$$=95-31.4$$
$$=63.6°\text{ C.}$$

$T_{HTF,max}$ and $T_{HTF,min}$ differ by only a few K from their estimated values (265° C. and 65° C., respectively), obviating any need to adjust thermo-physical properties.

13. Predicted $COP_C$

For constant $c_{p,HTF}$ the fraction of heat regenerated $\chi_{reg}$ is (see FIG. 26):

$$\chi_{reg}=\frac{(T_{ads,max}+\Delta T_{HTF\text{-}ads,cooling})-T_{HTF,min}}{(T_{HTF,max}-T_{HTF,min})} \tag{34}$$
$$=\frac{(200-31.4)-63.6}{(262.7-63.6)}$$
$$=\frac{105}{199.1}$$
$$=0.527$$

$$\dot{Q}_{make\text{-}up}=\dot{Q}_{HTF}(1-\chi_{reg}) \tag{35}$$
$$=\dot{m}_{HTF}\times c_{p,HTF}\times(T_{HTF,max}-T_{HTF,min})(1-\chi_{reg})$$

$$\dot{Q}_{make\text{-}up}=0.0362\times1968\times(262.7-63.6)(1-0.527) \tag{36}$$
$$=6704\text{ W}$$

$$COP_C=\dot{Q}_{cool}/\dot{Q}_{make\text{-}up} \tag{37}$$
$$=3333/6704$$
$$=0.497$$

$\dot{Q}_{make\text{-}up}$=6.70 kW is 89% of available exhaust heat in city cruise, $\dot{Q}_{exh,avail}$=7.50 kW (FIG. 22), and 94% of $\dot{Q}_{HTF,heater}$=7.09 kW that can be recovered by the HTF heater (see Section 8.2). Similar computations are performed for $\dot{Q}_{cool}$=2.00 kW at idle and $\dot{Q}_{cool}$=4.00 kW in highway cruise. The results for all three driving modes during a typical 20 minute commute are in FIG. 27. The 5 minute warm-up period for the exhaust system and heat pump is assumed to be split into 2 minutes during idling and 3 minutes during city driving; hence the heat pump operates for 5 of 7 minutes of idling and 5 of 8 minutes of city cruising. The heat pump is run at $\dot{Q}_{cool}$=2.00 kW for 10 minutes after the engine is shut off to maintain high $COP_C$ while recharging the $NH_3$ reservoir. The cumulative cooling $Q_{cool}$=66.7 kW-min. is equal to the amount determined in Section 6.2. $Q_{make\text{-}up}$=120 kW-min. is 90% of $Q_{HTF,heater}$=133 kW-min. that can be recovered by the HTF heater, allowing for 10% heat loss.

The average SCP=408 W.kg$^{-1}$ of activated carbon, which is 185% of the 220 W.kg$^{-1}$ demonstrated by Miles et al. (1993) [9] and 69% of 590 W.kg$^{-1}$ predicted by Jones (1993) [10].

8.1.5 Validation of Analytical Thermal Model Against State-of-the-Art Prototype in Literature Tchernev et al. [7, 8] built a prototype that exhibited a $COP_C$=1.2. The values of $\chi_{reg}$ and $COP_C$ for Tchernev et al. [7, 8] are computed from the analytical model developed for the present design, modified for geometry, materials, etc. Their bench top prototype produced 1759 W cooling. $T_{source}=T_{HTF,max}$=478 K and $T_{sink}=T_{HTF,min}$=311 K, which are the extremes to which the HTF was heated and cooled. It is estimated the consolidated zeolite had 35% porosity, $k_{ads}\approx0.25$ W.m$^{-1}$.K$^{-1}$ (silica fired brick), and $h_{junc}\approx1000$ W.m$^{-2}$.K$^{-1}$, relatively high because springs were used to compress the stack of alternating layers of zeolite tiles and copper serpentine HEX (see FIG. 9). The analytical model yields $\Delta T_{HTF\text{-}ads}$=22.4 K and $\dot{Q}_{make\text{-}up}$=1445 W. Predicted $\chi_{reg}$=0.731 is 2.5% less than experimental $\chi_{reg}$=0.75, and predicted $COP_C$=1.22 is only 1.7% above experimental $COP_C$=1.2.

Figure 28:
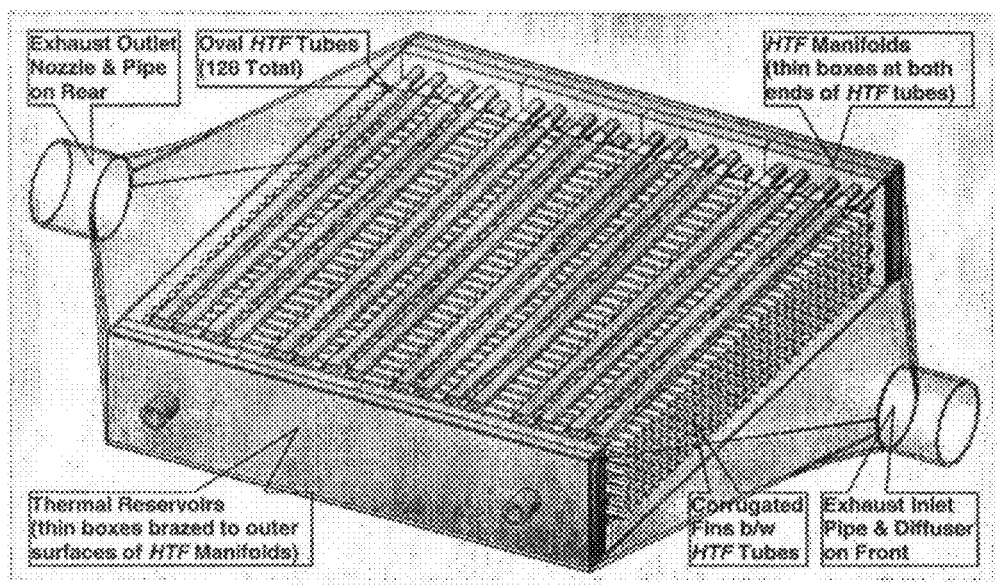
FIG. 28: Isometric view of the heat transfer fluid (HTF) heater, showing oval HTF tubes, manifolds, corrugated fins, and thermal reservoirs containing phase change material (PCM).

8.2 Heat Transfer and Exhaust Pressure Drop in HTF Heater 8.2.1 Configuration and Thermal Analysis of HTF Heater The HTF heater is a cross-flow compact heat exchanger (FIG. 28), similar to an automotive radiator. Its geometry is listed in FIG. 29. There are 128 oval tubes divided into 8 bundles of 16 tubes each. HTF flows through the 8 bundles in series, thereby making 8 serpentine passes across the exhaust flow. The oval tubes are stacked in 8 layers, interleaved with 9 layers of corrugated fins. The HTF heater is fabricated from ferritic stainless steel.

The analysis of a compact heat exchanger such as the HTF heater is straightforward and covered in such handbooks as [36]. Results are listed in FIG. 30.

Effectiveness $\epsilon_{HEX}$ is listed in FIG. 30 for a cross-flow heat exchanger with $\dot{C}_{max}$ (HTF) unmixed and $\dot{C}_{min}$ (exhaust) mixed. The HTF heater can recover $\dot{Q}_{HTF,heater}$ that is 94% to 97% of $\dot{Q}_{exh,avail}$. These values are also listed in FIG. 27 and compared with $\dot{Q}_{make\text{-}up}$, showing that during a 20 minute commute all exhaust needs to be routed through the HTF heater.

8.2.2 Exhaust Pressure Drop in HTF Heater

The maximum allowable pressure drop in the exhaust system is typically 4-8 kPa for normally aspirated engines, and 2-4 kPa for turbocharged engines. The method for computing exhaust pressure drop $\Delta P_{exh}$ through the HTF heater is also given in [36]. At the highest exhaust flow rate corresponding to highway cruise, total $\Delta P_{exh}$=0.40 kPa if the entire exhaust flow is routed through the HTF heater (FIG. 30), which is 10-20% of the 2-4 kPa total back pressure allowed for turbocharged engines. Moreover, the exhaust is quieted by appreciable expansion within the HTF heater, so the muffler can be omitted. This should offset the small $\Delta P_{exh}$ imposed by the HTF heater.

8.3 Mechanical Design of Adsorbers

The reservoir and adsorbers are pressure vessels designed in accordance with the ASME Boiler and Pressure Vessel Code [13]. The maximum operating pressure is $P_{cond}$=2948 kPa with ammonia as the refrigerant. The stress state is biaxial normal with $\sigma_{hoop}$=107.5 MPa, $\sigma_{long}$=39.9 MPa, and $\tau$=0. The corresponding von Mises stress is:

$$\sigma' = \sqrt{\sigma_{hoop}^2 + \sigma_{axial}^2 - \sigma_{hoop}\sigma_{axial} + 3\tau^2} = 94.2 \text{ MPa} \quad (72)$$

The ASME Boiler and Pressure Vessel Code [13] prescribes maximum operating stress as a function of temperature for each approved alloy. In highway cruise, the HTF will reach ≈300° C. At 343° C. (650° F.), the lowest temperature at which allowable stress data are listed for SS304, $\sigma_{arrow}$=97.2 MPa for seamless SS304 pipe, 3% greater than $\sigma'$=94.2 MPa. For proof testing to 150% of $P_{cond}$ at room temperature, $\sigma'$=141.3 MPa, which is 59% of $S_y$=241 MPa for annealed SS304. SS304 (18% Cr, 8% Ni) is also quite corrosion resistant so wall thinning should not be a problem. If so, then even more corrosion resistant SS316 (16% Cr, 12% Ni, 2% Mo) can be substituted at modestly greater expense. The nickel-silver braze in the joints has $S_{ys}$≈1300 MPa, many times greater than the proof shear stress $\tau$=9.2 MPa.

8.4 Control System

8.4.1 Computer and Sensors

The adsorption heat pump is controlled by the climate control computer. Feedback loop control of the adsorbers utilizes thermocouples installed on the adsorbers to monitor their temperatures.

8.4.2 Actuators (Servo, Solenoid, and Check Valves)

The climate computer controls the solenoid valve manifold (FIG. 16) that sequences the flow of HTF through the three adsorbers.

A servo motor controlled butterfly valve in the bypass branch of the exhaust pipe apportions exhaust through the HTF heater and bypass pipe in order to provide enough heat to operate the air conditioner. A second, solenoid controlled, butterfly valve in the HTF pipe branch closes when the air conditioner is off to prevent overheating the HTF, since the HTF pump is off when the air conditioner is off. The bypass valve is normally open when its servo is de-energized. If the servo fails, the valve remains open to prevent overheating the HTF. The HTF heater valve is normally closed when its solenoid is de-energized, i.e., heat pump is off. If the solenoid fails, the valve closes to prevent overheating the HTF.

At $T_{HTF}$≈160° C. the HTF expands about 12% with respect to $T_{amb}$. The total volume of HTF is about 5 liters, so the expansion tank must be about 0.6 liter. It is connected via a tee to a cool segment of HTF tubing. The vapor pressure of Dowtherm A® near $T_{amb}$ is negligible [9], allowing the entire volume of the expansion tank to be utilized.

A small solenoid valve installed in the high-pressure refrigerant tubing between the reservoir and the thermostatic expansion valve serves as the on/off valve to start or stop the flow of refrigerant through the evaporator. Passive one-way "check" valves prevent reversal of refrigerant flow from the condenser and reservoir to the adsorbers or from the adsorbers to the evaporator. The power drain of all servos and solenoids is insignificant

8.4.3 HTF Pump, R-134a Pump, and HTF Cooler Fan

For the HTF loop, $\Delta P_{HTF}$=98 kPa at $\dot{V}_{HTF,max}$=4.0 liters.min$^{-1}$, requiring 6.5 W of pumping power. For the R-134a loop, $\Delta P_{R134a}$=78 kPa at $\dot{V}_{R134a}$=0.78 liter.min$^{-1}$, requiring 1.0 W of pumping power. Assuming only 30% efficiency for small DC motors, the electrical input is (6.5 W+1.0 W)÷0.30=25 W.

The radiator fan also serves the HTF cooler, since it is in front of the radiator. The extra pressure drop of air passing through the HTF cooler is roughly equal to the extra pressure drop through the NH$_3$ condenser, about 100 Pa. For a required airflow rate through the HTF cooler of about 1.0 m$^3$.s$^{-1}$, the required extra fan power is 100 W, but only at idle and low speeds. At city and highway cruise speeds, ram air induction allows the radiator fan to turn off, so the average additional fan power imposed by the HTF cooler during typical commuting is about 25 W, which correlates to about an additional 40 W electrical load for a fan motor with 63% efficiency.

Thus, the electrical power demand of the adsorption heat pump is (25 W+40 W)÷1620 W=4.0% of the average power drawn by the mechanical compressor of a subcompact car during commuting (at average 67% duty cycle).

9. Comparison of Adsorption & Mechanical Air Conditioners

The mass breakdowns of mechanical compression and adsorption heat pumps are listed in FIG. 30 for all three types of vehicles identified in FIG. 1, Part 1 (subcompact, compact, and midsize). FIG. 31 also lists average vehicle mass, plus one occupant (~78 kg), for all three classes considered. The adsorption heat pumps are 40 to 52 kg heavier than their mechanical counterparts. This equates to 3.5-3.6% of total vehicle mass. The percentage reduction in fuel mileage due to extra mass is about 60% of the percentage extra mass, since wind resistance accounts for about 40% of the overall power requirement averaged over city and highway cruise speeds. So the reduction in fuel mileage would be 2.0-2.2%. For commuting, the increase in fuel mileage is 14%, 17%, and 18% for midsize, compact, and subcompact cars, respectively (see Section 1.3). Assuming the air conditioner is used ⅓ of the time (4 months per year) the increase in fuel mileage would be about 4.6% to 6.0%. Thus, the overall benefit (reduction in auxiliary power demand) of the adsorption air conditioner outweighs the mass penalty by a factor of 2.3 (=4.6%÷2.0%) for midsize, 2.7 (=5.7%÷2.1%) for a compact, and 2.7 (=6.0%÷2.2%) for subcompact cars.

10. Conclusions

Using exhaust heat to power an automotive air conditioner would virtually eliminate the substantial power demand of currently universal mechanical compressors, thereby increasing fuel mileage and reducing pollution.

Of available thermally powered cooling technologies, adsorption (solid-vapor) heat pumps are smaller and lighter than absorption (liquid-vapor), reversed Stirling, and Peltier coolers, the last two of which would require bulky thermoelectric generators.

An adsorption heat pump is feasible for the following reasons:

(1) It can potentially reduce fuel consumption by 14% to 18% when in use (for a 50/50 mix of city and highway driving for midsize, compact, and subcompact cars), or 4.6% to 6.0% annually if the air conditioner is used 4 months of the year. This enhancement is diluted by the increased mass of the adsorption heat pump as compared with a mechanical compressor. The benefit-to-cost ratio in terms of fuel savings from eliminating the mechanical compressor as compared with the increased mass of the adsorption heat pump is 2.3:1 for midsize cars and 2.7:1 for compact and subcompact cars.

(2) The enhanced performance described herein employs cost effective and proven components, materials, and essentially new manufacturing techniques with no exotic technologies or materials being used.

(3) Its performance can match that of mechanical vapor compression devices. For instance, a refrigerant reservoir can provide immediate cooling after start up of a cold engine, as is so for a mechanical compressor.

(4) A refrigerant reservoir is especially useful for hybrid vehicles in which the engine is turned off during idling. A mechanical compressor would require a 2.4 to 3.4 kW motor that would add mass and drain battery charge, the latter of which is at a premium.

(5) There, is enough heat in the exhaust of even a subcompact car to power an adsorption heat pump at sufficient cooling capacity.

The examples set forth above are provided to give those of ordinary skill in the art with a complete disclosure and description of how to make and use the preferred embodiments of the present invention, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

REFERENCES

1 U.S. Department of Energy, Energy Information Administration, www.eia.doe.gov, Washington D.C., downloaded Apr. 25, 2004.

2 Texas Transportation Institute, www.tti.tamu.edu, Texas A&M University, College Station, Tex., USA, downloaded Apr. 21, 2004.

3 Boatto, P., Boccaletti, C., Cerri, G., and Malvicino, C., *Proceedings of the Institution for Mechanical Engineers, Part D, Journal of Automobile Engineering*, 214:979-982, 2000.

4 Boatto, P., Boccaletti, C., Cerri, G., and Malvicino, C., *Proceedings of the Institution for Mechanical Engineers, Part D, Journal of Automobile Engineering*, 214:983-989, 2000.

5 Bhatti, M. S., "Evolution of Automotive Air Conditioning, Riding in Comfort: Part II," *ASHRAE Journal*, September 1999, pp. 44-50.

6 Global Cooling, "Stirling Cooling," www.globalcooling.ni, Athens, Ohio, USA, downloaded, Jun. 20, 2004.

7 Tchernev, D. I. and Emerson, D. T., *ASHRAE Transactions*, Paper OT-88-19-3, 1988, pp. 2024-2029.

8 Tchernev, D. I., and Clinch, J. M., *Proceedings of the ASME 11$^{th}$ Annual Solar Energy Conference*, San Diego, Calif., American Society of Mechanical Engineers, New York, 1989, pp. 347-351.

9 Miles, D. J., Sanborn, D. M., Nowakowski, G. A., and Shelton, S. V., *Heat Recovery Systems and Combined Heat & Power*, 13:347-357, 1993.

10 Jones, J. A., *Proceedings of the International Absorption Heat Pump Conference, ASME Advanced Energy Systems (AES)*, 31:449-455, 1993.

11 Melcor Corp., "Product Specifications," www.melcor.com, Trenton, N.J., USA, downloaded Jun. 20, 2004.

12 TE Technology Inc., "Thermoelectric Assemblies, Air Coolers," www.tetech.com, Traverse City, Mich., USA, downloaded Jun. 20, 2004.

13 Kwak, S., Willner, C. A., Konstantakopoulos, G., and Dinda, S., "Thermoelectric Generators for Wasted Heat Energy Recovery," Report by the Advanced Technology Assessment Team, Daimler-Chrysler Corp., Apr. 4, 2004.

14 PGI International, "Thermoelectric Chargers," www.pgi-int.comm, Houston, Tex., USA, downloaded Jun. 20, 2004.

15 Miller, E. B., *American Society of Refrigeration Engineers*, 17:103-108, 1929.

16 Lambert, M. A., and Jones, B. J., *AIAA Journal of Thermophysics and Heat Transfer*, 19:471-485, 2005.

17 Shelton, S. V., Wepfer, W. J., and Miles, D. J., *ASME Journal of Energy Resources Technology*, Advanced Energy Systems (AES) Division, 112:70-75, 1990.

18 Meunier, F., and Douss, N., *Proceedings of the 1990 ASHRAE Meeting*, St. Louis, Mo., 1990, p. 3412.

19 Pons, M., Laurent, D., and Meunier, F., *Applied Thermal Engineering*, 16:395-404, 1996.

20 Ben Amar, N., Sun, L. M., and Meunier, F., *Applied Thermal Engineering*, 16:405-418, 1996.

21 Meunier, F., Poyelle, F., and LeVan, M. D., *Applied Thermal Engineering*, 17:43-55, 1997.

22 Guilleminot, J. J., Poyelle, F., and Meunier, F., Paper No. SF-98-21-1, *ASHRAE Transactions: Symposia*, 1998: 1543-1552.

23 Poyelle, F., Guilleminot, J., and Meunier, F., *Industrial Engineer, Chemical Resources*, American Chemical Society, 38:298-309, 1999.

24 Saha, B., Akisawa, A., and Kashiwagi, T., *Proceedings of the 1997 32$^{nd}$ Intersociety Energy Conversion Engineering Conference*, Vol. 2 (of 4): Electrochemical Technologies, Conversion Technologies, and Thermal Management, Honolulu, Hi., American Society of Mechanical Engineers, New York, 1997, p. 1258.

25 Wang, R. Z., Wu, J. Y., Xu, Y. X., Teng, Y., and Shi, W., *Applied Thermal Engineering*, 18:13-23, 1998.

26 Zhang, L. Z., and Wang, L., *Applied Thermal Engineering*, 19:195-215, 1999.

27 Restuccia, G. and Cacciola, G., *International Journal of Refrigeration*, 22:18-26, 1999.

28 Cacciola, G., Restuccia, G., and van Benthem, G. H. W., *Applied Thermal Engineering*, 19:255-269, 1999.

29 Cerkvenik, B, Poredos, A., and Ziegler, F., *International Journal of Refrigeration*, 24:475-485, 2001.

30 ASME Boiler and Pressure Vessel Code, Section VIII: Rules for Construction of Pressure Vessels, Division 1, American Society of Mechanical Engineers (ASME), New York, Jul. 1, 1986, pp. 382-383.

31 Breck, D., *Zeolite Molecular Sieves*, John Wiley & Sons, New York, 1974, pp. 600-612.

32 Bish, D. and Ming, D., *Reviews in Mineralogy & Geochemistry*, Mineralogical Society of America, 45:589-617, 2001.

33 Vasiliev, L. L., Kanonchik, L. E., Khrolenok, V. V., Mishkinis, D. A., Zhuravlyov, A. S., Technical Paper, Series 941580, Society of Automotive Engineers (SAE), 1994, pp. 224-335.

34 Fertilizer Works™, Material Safety Data Sheet (MSDS) for anhydrous ammonia ($NH_3$), http://www.fertilizerworks.com/html/msds_anhyd.html, downloaded Feb. 13, 2006.

35 Dow Chemical Corp., Specifications for Dowtherm® Heat Transfer Fluids (A, G, RP, Q, J, HT, T, & MX), www.dow.com/heattrans/index.htm, downloaded Feb. 15, 2006.

36 Kays, W. M. and London, A. L., *Compact Heat Exchangers*, 3rd edition, McGraw-Hill, New York, 1984.

What is claimed is:

1. An adsorber unit for an adsorption heat pump, comprising:
   a thermally insulated outer shell with a first end and a second end;
   a first and second thermally insulated plenum having the first plenum attached to the first end of the outer shell and the second plenum attached to the second end of the outer shell, wherein each plenum has at least one opening;
   a plurality of thermally conductive tubes aligned longitudinally inside the shell, each tube having an outside surface, wherein each tube comprises a plurality of projections extending from the outside surface of the tube and projecting outwardly therefrom, wherein each tube has a first and second ends; and wherein the first end of each tube is attached to the first plenum, and the second end of the tube is attached to the second plenum;
   at least one solid absorbent inside the shell surrounding the tubes; and
   at least one refrigerant capable of being adsorbed and desorbed by the adsorbent, inside the outer shell;
   wherein the outer shell, the first and second plenums, and the outside surfaces of the tubes form a closed system for containment of the absorbent and the refrigerant.

2. The adsorber unit of claim 1, wherein at least one of the thermally conductive tubes further comprises first thermally conductive material filled between the projections for further increasing the heat transfer surface area.

3. The adsorber unit of claim 2, wherein the first thermally conductive material is metal wool, metal wires, or carbon fibers.

4. The adsorber unit of claim 1, wherein the solid adsorbent is one or more selected from the group consisting of zeolites, silicas, aluminas, active carbons, and graphites.

5. The adsorber unit of claim 1, wherein the refrigerant is one or more selected from the group consisting of water, ammonia, and low-boiling point alcohols, and halogenated refrigerants.

6. The adsorber unit of claim 1, wherein the projections have higher thermal conductivity than the adsorbent.

7. The adsorber unit of claim 1, wherein the projections have a thermal conductivity at least twice as large as the adsorbent.

8. The adsorber unit of claim 1, wherein the projections have a thermal conductivity at least ten-fold as large as the adsorbent.

9. The adsorber unit of claim 1, wherein the projections are thin thermally conductive material.

10. The adsorber unit of claim 1, wherein the projections are helically wound around the tube.

11. The adsorber unit of claim 1, wherein the projections are annular metallic strips.

12. The adsorber unit of claim 1, wherein the projections are fins.

13. The adsorber unit of claim 1, wherein the projections have a total surface area at least as large as the total outside surface area of the tubes.

14. The adsorber unit of claim 1, wherein the tubes have a greater transverse thermal conductance than their longitudinal thermal conductance.

15. The adsorber unit of claim 2, wherein the first thermally conductive material has a surface area at least as large as the outside surface area of the tubes.

16. The adsorber unit of claim 1, wherein the outer shell is cylindrical.

17. The adsorber unit of claim 1, wherein the adsorbent is powders, particulates, or granules.

18. The adsorber unit of claim 1, wherein each tube further comprises second thermally conductive material inside of the tube and contacting with the inside surface of the tube with minimum blocking of the flow of a heat transfer medium passing through the tube.

19. The adsorber unit of claim 18, wherein the second thermally conductive material is metal wool, metal wires, or carbon fibers.

20. An adsorption heat pump comprising one or more adsorber units of claim 1.

* * * * *